(12) United States Patent
Al-Dossary et al.

(10) Patent No.: US 8,705,315 B2
(45) Date of Patent: Apr. 22, 2014

(54) SIMULTANEOUS WAVELET EXTRACTION AND DECONVOLUTION IN THE TIME DOMAIN

(75) Inventors: Saleh Al-Dossary, Dammam (SA); Jinsong Wang, Dhahran (SA)

(73) Assignee: Saudi Arabian Oil Company (SA)

( * ) Notice: Subject to any disclaimer, the term of this patent is extended or adjusted under 35 U.S.C. 154(b) by 317 days.

(21) Appl. No.: 13/071,695

(22) Filed: Mar. 25, 2011

(65) Prior Publication Data

US 2012/0243372 A1     Sep. 27, 2012

(51) Int. Cl.
    *G01V 1/28* (2006.01)
(52) U.S. Cl.
    USPC .............................. 367/38; 702/14
(58) Field of Classification Search
    USPC ............... 367/38, 50; 702/14, 17
    See application file for complete search history.

(56) References Cited

U.S. PATENT DOCUMENTS

| 6,058,073 A * | 5/2000 | VerWest ........................ 367/38 |
| 6,374,185 B1 * | 4/2002 | Taner et al. .................... 702/14 |
| 2010/0185422 A1 | 7/2010 | Hoversten |

OTHER PUBLICATIONS

Cheng, Qiangshen et al., "Simultaneous Wavelet Estimation and Deconvolution of Reflection Seismic Signals", IEEE Transactions on Geosciences and Remote Sensing, Mar. 1996, pp. 377-384, vol. 34, No. 2.
Kaaresen, Kjetil, et al., "Multichannel Blind Deconvolution of Seismic Signals", Geophysics, Nov.-Dec. 1998, pp. 2093-2107, vol. 63, No. 6.
Van Der Baan, Mirko, et al., "Robust Wavelet Estimation and Blind Deconvolution of Noisy Surface Seismics", Geophysics, Sep.-Oct. 2008, pp. V37-V46, vol. 73, No. 5.
Rosec, Olivier, et al."Blind Marine Seismic Deconvolution Using Statistical MCMC Methods", IEEE Journal of Oceanic Engineering, Jul. 2003, pp. 502-512, vol. 28, No. 3.
Chib, S., et al., "Understanding the Metropolis-Hastings Algorithm", The American Statistician, Nov. 1995, pp. 327-335, vol. 49, No. 4.
Labat, Christian, et al., "Sparse Blind Deconvolution Accounting for Time-Shift Ambiguity", IEEE, 2006, pp. 616-619.
Doucet, Arnaud, et al., "Monte Carlo Methods for Signal Processing", IEEE Signal Processing Magazine, Nov. 2005, pp. 152-170.
Lines, L.R. et al., "The Old and the New in Seismic Deconvolution and Wavelet Estimation", Geophysical Prospecting, 1977, 25, pp. 512-540.
Warren T. Wood, Simultaneous deconvolution and wavelet inversion as a global optimization, Geophysics, Society of Exploration Geophysicists, US, vol. 64, No. 4, Jul. 1, 1999, pp. 1108-1115.
PCT/US12/28046 Search Report and Written Opinion mailed Nov. 8, 2012.

* cited by examiner

*Primary Examiner* — Ian J Lobo
(74) *Attorney, Agent, or Firm* — Bracewell & Giuliani LLP; Constance G. Rhebergen; Albert B. Kimball, Jr.

(57) ABSTRACT

Blind wavelet extraction and de-convolution is performed on seismic data to enable its practical usage in seismic processing and to provide quality control of data obtained in areas where data from wells are not available. The wavelet extraction and deconvolution are realized in the time domain by iteration, producing a mixed phase wavelet with minimal prior knowledge of the actual nature of the wavelet. As a result of the processing, the de-convolved seismic reflectivity is obtained simultaneously.

12 Claims, 20 Drawing Sheets
(3 of 20 Drawing Sheet(s) Filed in Color)

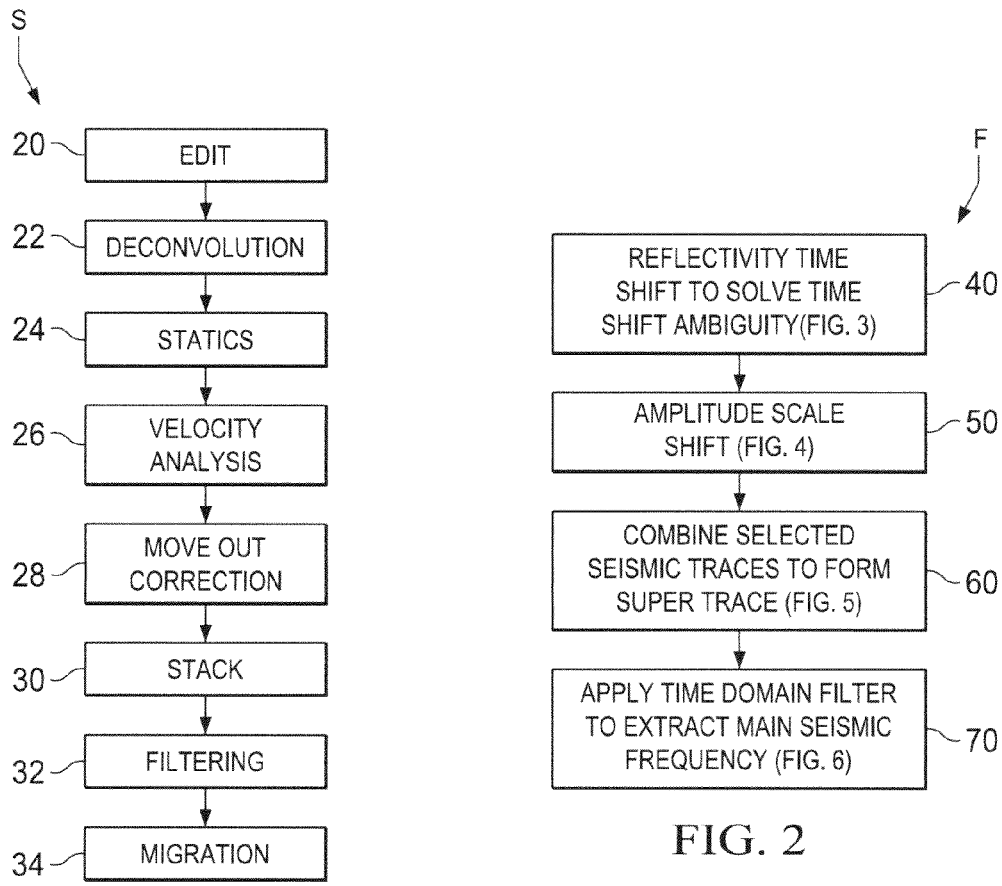
FIG. 1
FIG. 2
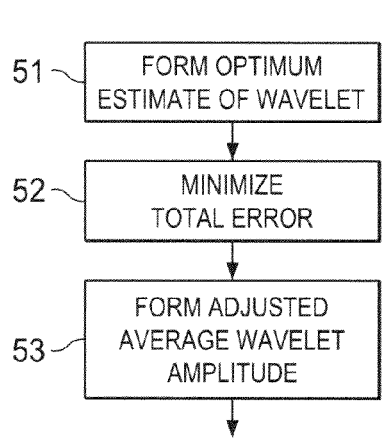
FIG. 4
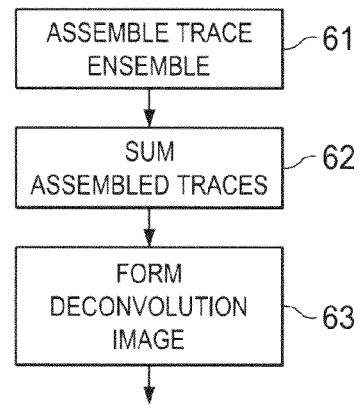
FIG. 5

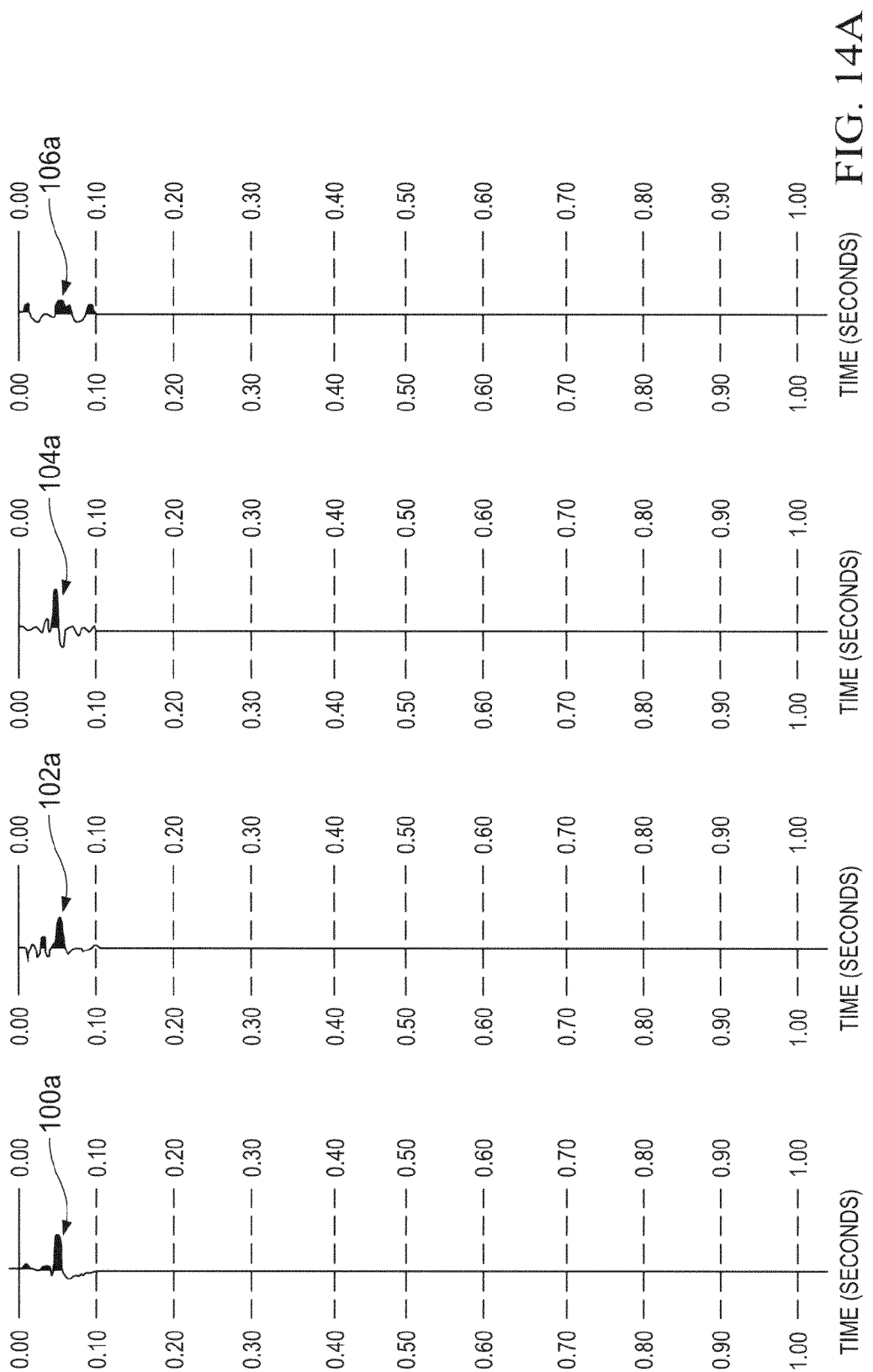

SIMULTANEOUS WAVELET EXTRACTION AND DECONVOLUTION IN THE TIME DOMAIN

BACKGROUND OF THE INVENTION

1. Field of the Invention

The present invention relates to seismic data processing and more particularly, to wavelet extraction and deconvolution during seismic data processing.

2. Description of the Related Art

Reflection seismology is a process which records as seismic data for analysis the reflected energy resulting from acoustic impedance changes in the earth due to the location and presence of subsurface formations or structure of interest. The reflected energy results from the transmission of short duration acoustic waves into the earth at locations of interest in a format which is known as a wavelet. The responses to the wavelet were in effect a combined product or convolution of the wavelet and the vertical reflectivity of the earth. To increase the resolution of the data and provide for enhanced ability in its interpretation, it has been common practice to subject the data to a processing technique known as deconvolution. Deconvolution involved removal of the effects of the wavelet on the recorded data.

For several reasons, the actual nature and characteristics of the actual wavelet sent into the earth were not precisely determinable. Two approaches have been used in attempt to take this into account. The first approach has been to assume that the wavelet was of an ideal form known as a zero phase or minimum phase wavelet. In seismic processing, if only seismic data exists, in order to obtain wavelet and proceed deconvolution, routinely a zero phase or minimum phase is assumed followed by inverting the wavelet and applying deconvolution. The conventional wavelet extraction and deconvolution requires zero or minimum phase assumption with two steps of procedure in frequency domain. But in fact the real wavelet is neither zero nor minimum phase.

The second approach was known as blind deconvolution, where a statistical estimate of the form of the wavelet was postulated, based on experience, field data and the like. Various forms of blind deconvolution have been proposed, one of which used what is known as the Markov Chain Monte Carlo (or MCMC) method. Recently, the MCMC method has gained attention in research to address higher order statistics features and thus obtain the wavelet with phase and reflectivity simultaneously. However, the MCMC method as a blind solution for simultaneous wavelet estimation and deconvolution has ambiguity problems, as well as other practical limitations which prevent the algorithm from being practically applied in seismic processing. The Markov Chain Monte Carlo approach appears to solve both wavelet and deconvolution at the same time. However, challenges prevent the algorithm to be practically applied to seismic industry. The first is that a maximum energy position is required, but such a position is usually unknown. Second, the extracted wavelet has possessed frequencies which were mostly out of the seismic input frequency band. Third, the deconvolution outcome resulting from trace to trace operation sometimes has broken and weakened the seismic events since multiple wavelets are extracted from multi-channel traces.

Blind deconvolution using the MCMC approach has thus been a research topic in recent years. Unlike traditional power spectrum approaches in the frequency domain done in wavelet extraction and deconvolution, the MCMC approach has treated the deconvolution processing as a problem of parameter estimation to model the reflectivity, wavelet and noise with different statics distributions by multiple sampling in the time domain. After adequate iterations of sampling, the wavelet and reflectivity series have been intended to converge to the real geological model.

The MCMC approach to blind deconvolution has, so far as is known, made certain assumptions prior to parameter estimations and then applied what is known as a Bayes approach for the implementation. The reflectivity sequence has been assumed to be random (white noise) and susceptible to being modeled statistically by what is known as a Bernoulli-Gaussian process. Another assumption has been that the wavelet can be represented by a multivariate Gaussian function. A further assumption has been that any noise present is uncorrelated, and therefore can be modeled by an independent identically distributed Gaussian function with mean zero, i.e. Inversed Gamma, distribution.

SUMMARY OF THE INVENTION

Briefly, the present invention provides a new and improved computer implemented method of processing seismic data obtained in the form of seismic traces from a reflection seismic survey of subsurface portions of the earth for analysis of subsurface features of interest, the computer implemented method comprising the steps of: forming a wavelet from the seismic survey data; resolving a time of occurrence of maximum energy in the wavelet from the seismic survey data; forming a normalized amplitude of energy for the wavelet from traces in the seismic survey data; forming a composite trace at the resolved time of occurrence and normalized amplitude from an ensemble of the traces in the seismic survey data; applying a time filter to the wavelet based on the composite trace to form a resultant deconvolution wavelet having a main frequency in the seismic frequency band; and performing a deconvolution operation by applying the resultant deconvolution wavelet to the seismic data.

The present invention also provides a new and improved data processing system for processing seismic data obtained in the form of seismic traces from a reflection seismic survey of subsurface portions of the earth for analysis of subsurface features of interest. The data processing system comprises: a processor performing the steps of forming a wavelet from the seismic survey data; resolving a time of occurrence of maximum energy in the wavelet from the seismic survey data; forming a normalized amplitude of energy for the wavelet from traces in the seismic survey data; forming a composite trace at the resolved time of occurrence and normalized amplitude from an ensemble of the traces in the seismic survey data; applying a time filter to the wavelet based on the composite trace to form a resultant deconvolution wavelet having a main frequency in the seismic frequency band; and performing a deconvolution operation by applying the resultant deconvolution wavelet to the seismic data.

The present invention further provides a new and improved data storage device having stored in a non-transitory computer readable medium computer operable instructions for causing a data processing system to process seismic data obtained in the form of seismic traces from a reflection seismic survey of subsurface portions of the earth for analysis of subsurface features of interest, the instructions stored in the data storage device causing the data processing system to perform the following steps: forming a wavelet from the seismic survey data; resolving a time of occurrence of maximum energy in the wavelet from the seismic survey data; forming a normalized amplitude of energy for the wavelet from traces in the seismic survey data; forming a composite trace at the resolved time of occurrence and normalized amplitude from an ensemble of the traces in the seismic survey data; applying a time filter to the wavelet based on the composite trace to form a resultant deconvolution wavelet having a main frequency in the seismic frequency band; and performing a deconvolution operation by applying the resultant deconvolution wavelet to the seismic data.

BRIEF DESCRIPTION OF THE DRAWINGS

The file of this patent contains at least one drawing executed in color photography. Copies of this patent with color photographs will be provided by the Patent and Trademark Office upon request and payment of necessary fee.

FIG. 1 is a simplified functional block diagram or flow chart of a conventional sequence for processing seismic data in exploration for subsurface hydrocarbon reserves.

FIG. 2 is a functional block diagram or flow chart of a sequence of simultaneous wavelet extraction and deconvolution in the time domain according to the present invention.

FIG. 4 is a functional block diagram in more detail of a portion of the diagram of FIG. 2.

FIG. 5 is a functional block diagram in more detail of a portion of the diagram of FIG. 2.

FIGS. 14A and 14B are plots of extracted wavelets from various types of seismic energy sources with and without time domain filtering according to the present invention, respectively.

DETAILED DESCRIPTION OF THE PREFERRED EMBODIMENTS

Figure 3:
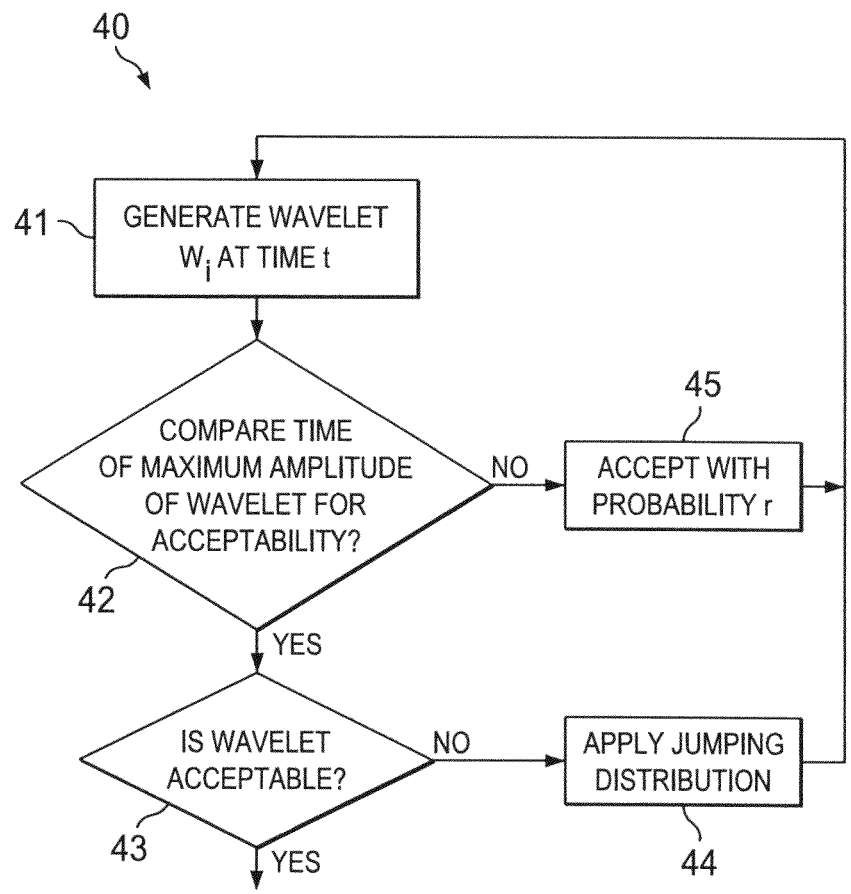
FIG. 3 is a functional block diagram in more detail of a portion of the diagram of FIG. 2.

In the drawings, FIG. 1 illustrates schematically a diagram of the basic general sequence S of processing data from seismic acoustic surveys to obtain images of the location of subsurface features in the earth. During a step 20, the field recoded seismic trace data are edited and identified, and arranged into proper form for subsequent processing. The data are then subject to deconvolution processing during step 22 as has been described above. As will be set forth, the present invention has developed processing techniques by which the results of the deconvolution processing of seismic data can be greatly enhanced. Step 24 involves statics correction where a bulk time shift of is applied to the trace data to compensate the effects of near surface features and anomalies in the earth, as well as for differences in topography and elevations of sources and receivers. Step 26 is velocity analysis processing to determine a seismic velocity function representing the velocity of energy travel through the earth as a function of depth. Step 28 involves moveout correction to adjust for differences in signal arrival time at different receiver positions. Step 30 is the process of stacking or summing the individual seismic trace to improve the signal-to-noise ratio of the data. Step 32 is a data filtering process to remove undesirable portions of the data for certain purposes such as improving signal-to-noise ratio, removing certain frequencies, amplitudes or other unwanted information. Step 34 is the migration process during which reflections in seismic data are moved to their correct spatial locations from those based on time measured in the recorded and processed seismic data. The migrated data are then stored in memory and displays formed for analysis and interpretations.

As has been set forth, it is important to obtain an accurate version of the seismic wavelet, and in some cases the process of blind deconvolution is used for this purpose. One such technique of blind deconvolution of seismic data is the Markov Chain Monte Carlo, also known as MCMC, simulation method.

A typical such blind deconvolution technique of Markov Chain Monte Carlo simulation with Gibbs sampling is described, for example, in "Monte Carlo Methods for Signal Processing", IEEE Signal Processing Magazine, 2005, p. 152-169. The method described for obtaining samples according to this technique requires several assumptions mentioned above: that reflectivity is random (white noise) and susceptible to being modeled statistically by what is known as a Bernoulli-Gaussian process; that the wavelet can be represented by a multivariate Gaussian function; and any noise present is uncorrelated, and therefore can be modeled by an independent identically distributed Gaussian function of a certain type.

It is also presumed that the joint posterior distribution of a given t (trace) is known to be: $P(w,r,n|t)$, where t is trace, r is reflectivity, w is the wavelet, and n represents noise. Accordingly, the wavelet indicating the wavelet content W, reflectivity r, and noise n can be randomly sampled from the measure P by the procedure of Gibbs sampling. The processing sequence is as follows:

Step 1: Set initial values $(w_0, r_0, n_0)$
Step 2: Generate $w_1$ from $P(w_0|r_0,n_0,t)$, $r_1$ from $P(r_0|w_1,n_0,t)$ and
$n_1$ from $P(n_0|w_1,r_1,t)$
Step 3: Repeat step 2 for K times until the minimum mean-square error (MMSE) calculated in step 4 is acceptably within a specified limit
Step 4: Calculate $$(w, r, n)_{MMSE} = \frac{1}{KJ} \sum_{K=J+1}^{K} (w_k, r_k, n_k)$$

Normally, the first J samples that are not stationary are discarded during the calculation step as indicated. This is done to eliminate possible correlations between samples of different iterations.

The MCMC techniques described above generate non-unique wavelet and reflectivity pairs have then been convolved in an attempt to match the input seismic trace, within the estimation error. However, the derived wavelets and reflectivity series so obtained are not unique. This problem is well documented in the literature, such as in "Simultaneous Wavelet Estimation and Deconvolution of Reflection Seismic Signals", IEEE Transactions on Geosciences and Remote Sensing, Vol. 34, No. 2, p. 377-384 (1996). The problem is based on what are known as time shift and scale ambiguity problems. See FIGS. 8A and 8B, as well as FIGS. 9A and 9B for details. There are multiple pairs of wavelet and reflectivity which when convolved satisfy the seismic input. However, among these multiple pairs, only one pair is the true solution. The resultant wavelet is the shifted wavelet of the true wavelet, and the reflectivity series will be shifted inversely (in the opposite direction). Scale ambiguity behaves the same; if amplified wavelet exceeds the amplitude scale, the reflectivity scale will be de-amplified to compensate for the amplified wavelet amplitude to yield the same seismic input. The present invention reduces ambiguity of those pairs and reveals a true reflectivity and wavelet pair in both position and amplitude.

A known solution to address time shift ambiguity has been to assign a maximum energy position to the wavelet. However, in most cases such a maximum energy position has been hard to determine in the data. Noisy data leads to poor extracted wavelets. Further, the short seismic time windows which have to be used do not in a number of cases satisfy the random sampling feature required in the processing technique. For these reasons, the MCMC processing results have, so far as is known, in cases proven not accurately representative of the geophysical model. Practical application and utilization of the prior art MCMC processing techniques for seismic deconvolution have not, so far as is known, been achieved.

With the present invention, a flow chart F (FIG. 2) illustrates the structure of the logic of the present invention as embodied in computer program software. The flow chart F is a high-level logic flowchart which illustrates a method according to the present invention of simultaneous wavelet extraction and deconvolution in the time domain. Those skilled in the art appreciate that the flow charts illustrate the structures of computer program code elements that function according to the present invention. The invention is practiced in its essential embodiment by computer components that use the program code instructions in a form that instructs a digital data processing system D (FIG. 7) to perform a sequence of processing steps corresponding to those shown in the flow chart F.

The flow chart F of FIG. 2 contains a preferred sequence of steps of a computer implemented method or process for simultaneous wavelet extraction and deconvolution in the time domain according to the present invention is illustrated schematically. The process of the present invention provides several improvements to the conventional MCMC methodology performed during the deconvolution processing such as that shown at process step 22 of FIG. 1. The present invention utilizes the assumptions which serve as the basis for the conventional MCMC approach, but overcomes the limitations discussed above regarding the MCMC processing, as will be discussed.

Solving Time Shift Ambiguity

According to the present invention, a sampling procedure known as Metropolis-Hastings (M-H) procedure is performed during a step 40 (FIG. 2) as a sampling acceptance rule in connection with the generation of the wavelet $W_i$ during the MCMC processing to solve the time shift ambiguity. Further details of the step 40 are shown in FIG. 3. In solving the time shift ambiguity, a new sample of the wavelet parameter is formed during a step 41 based on a previous one by using a jumping distribution. If during step 42 the increased likelihood of an acceptable amplitude sample being present is determined, then the new sample is accepted during step 43. A jumping time distribution is applied during step 44 and processing returns to step 41 for formation of a new wavelet at a time established according to the applied distribution. If the likelihood of an acceptable amplitude is determined during step 42 to be decreasing, then the new sample is accepted during step 45, but with a probability a defined as follows:

$$a = \frac{p(\theta^* | y) J_t(\theta^{t1} | \theta^*)}{p(\theta^{t1} | y) J_t(\theta^* | \theta^{t1})}$$

$$J(\underline{u}' | \underline{u}) = \begin{cases} \underline{u}' \text{ equals } \underline{u} \text{ with probability } 1 - 2a \\ \underline{u}' \text{ equals circular right shifted } \underline{u} \text{ with probability } a \\ \underline{u}' \text{ equals circular left shifted } \underline{u} \text{ with probability } a \end{cases}$$

Figure 10A:
FIGS. 10A, 10B and 10C are schematic illustrations of the effect of reflectivity sequence shift.
Figures 10B, 10C:
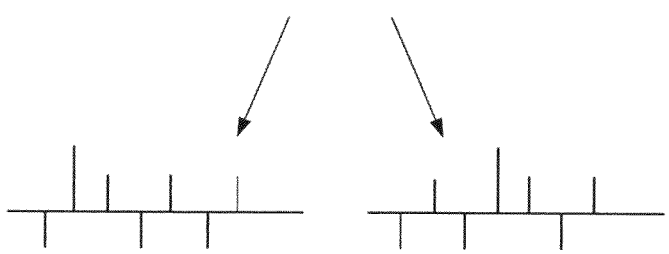

The probability is a different parameter than the reflectivity previously mentioned. See FIGS. 10A, 10B and 10C for example illustrations of reflectivity sequence shifts. The circular shift can be illustrated by the following example: given a series data of 10 numbers: $w_1, W_2, W_3, w_4, w_5, w_6, w_7, w_8, w_9, w_{10}$. If circular left shift is applied, the new series will become: $w_2, w_3, w_4, w_5, w_6, w_7, w_8, w_9, w_{10}W_1$. If circular right shift is applied, the new series will then become $w_{10}, w_1, w_2, w_3, w_4, w_5, w_6, w_7, w_8, w_9$.

Processing from step 45 also returns to step 41 for formation of a new wavelet. An explanation of the theoretical details of time shift ambiguities is set forth, for example, in Labat et al., "Sparse Blind Deconvolution Accounting for Time Shift Ambiguity" IEEE International Conference on Acoustics, Speech and Signal Processing, p. 616-619, 2006.

This article describes the problem of the MCMC approach providing several possible times where an occurrence of maximum amplitude being present, which does not physically occur with an impulse wavelet in seismic data acquisition.

Amplitude Scale Shifting

The resultant estimated wavelet samples resulting from each performance step 40 are shifted and scaled versions of each other. The estimated wavelets are brought by the time shifting processing of step 50 (FIG. 2) within a format compatible with what is known as the Gibbs sampling procedure. However, a direct sample average is not applicable. Normally, averaging non-correlated Gibbs samplings will yield minimum mean-squared error (MMSE) estimates, here it means: wavelet. With the present invention, an effort is made not to set a maximum energy point in the initial wavelet. Instead, a Metropolis-Hastings (M-H) procedure is applied to resolve time-shift ambiguity, the wavelet from each Gibbs sampling iteration has no-unified amplitude. Therefore direct averaging samples as a Gibbs sampling method used without amplitude scaling and shifting cannot give an approximated wavelet.

Accordingly, resealing and shifting the amplitude scale of the samples appropriately before averaging is necessary. Details of the step 50 of FIG. 2 are shown in FIG. 4. Thus, during an initial step 51 of step 50 an optimal estimate of wavelet amplitude is specified or determined. Then, the wavelets in the data are adjusted in amplitude during step 52 to minimize the total error of the wavelet from the optimal estimate. An average of the adjusted wavelet amplitude is then formed during step 53 to update the optimal estimate average. A scaling-shifting procedure is adopted to constrain the amplitude scale of the wavelet out of wavelets from different iterations.

Figure 8A:
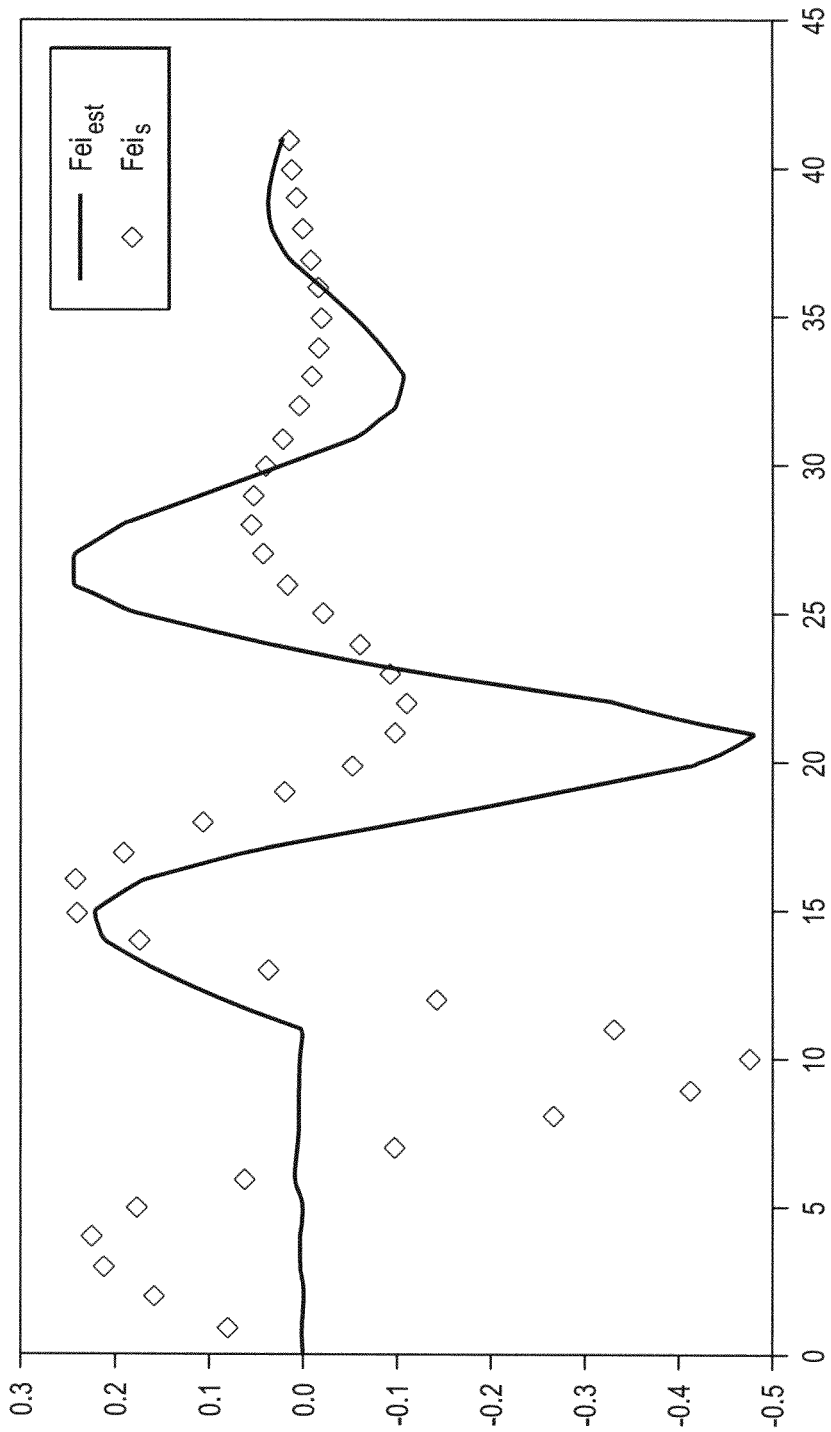
FIG. 8A is a plot of a wavelet illustrating a time shift effect according to the prior art.
Figure 8B:
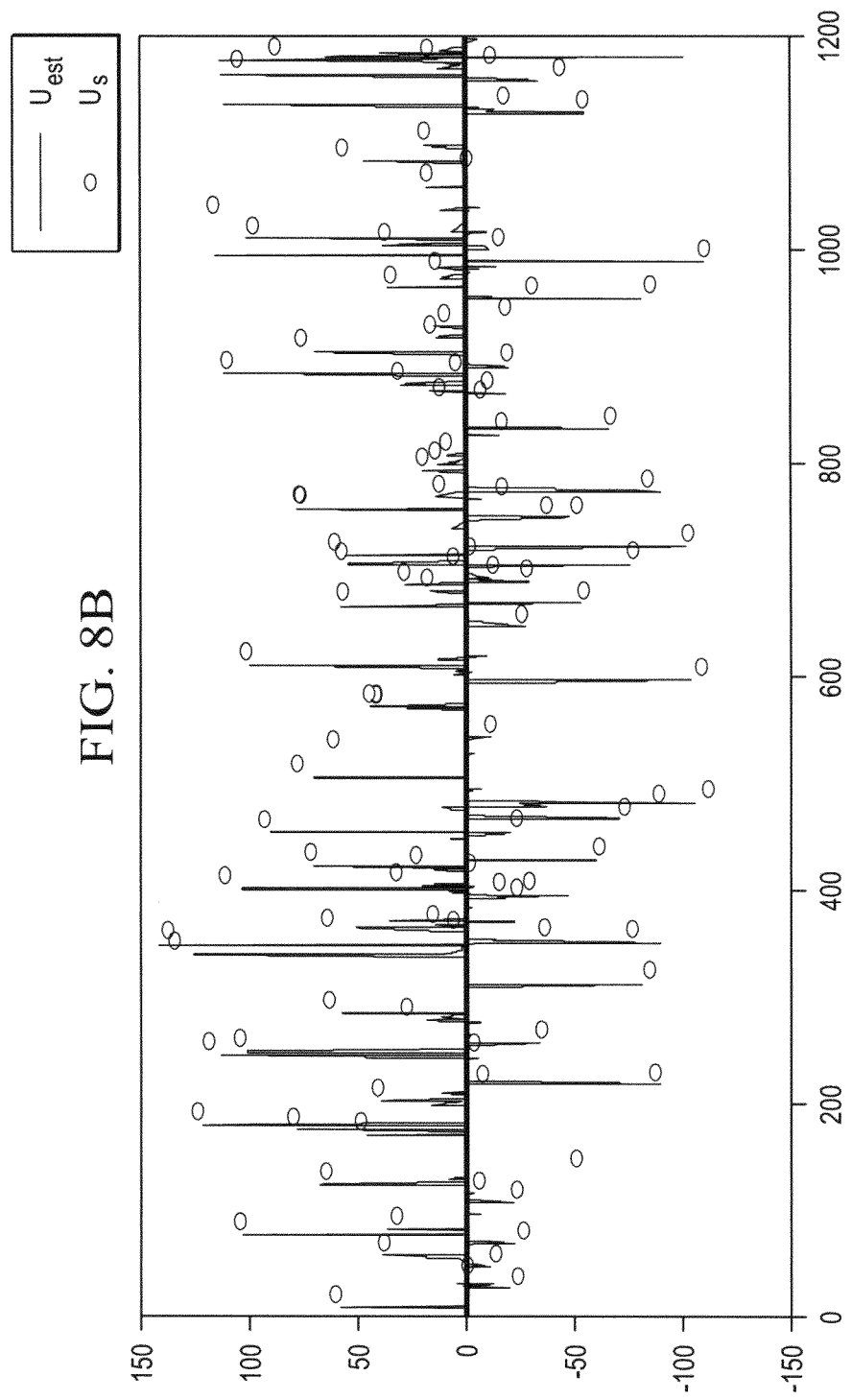
FIG. 8B is a plot of reflectivity based on the wavelet of FIG. 8A, also illustrating a time shift effect according to the prior art.
Figure 9A:
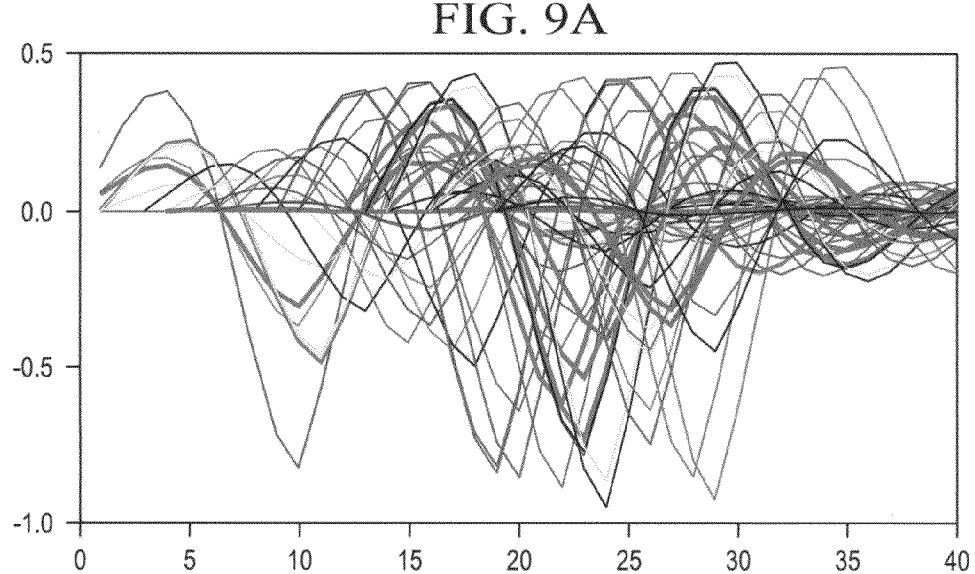
FIGS. 9A and 9B are plots of wavelets illustrating a scale ambiguity effect according to the prior art
Figure 9B:
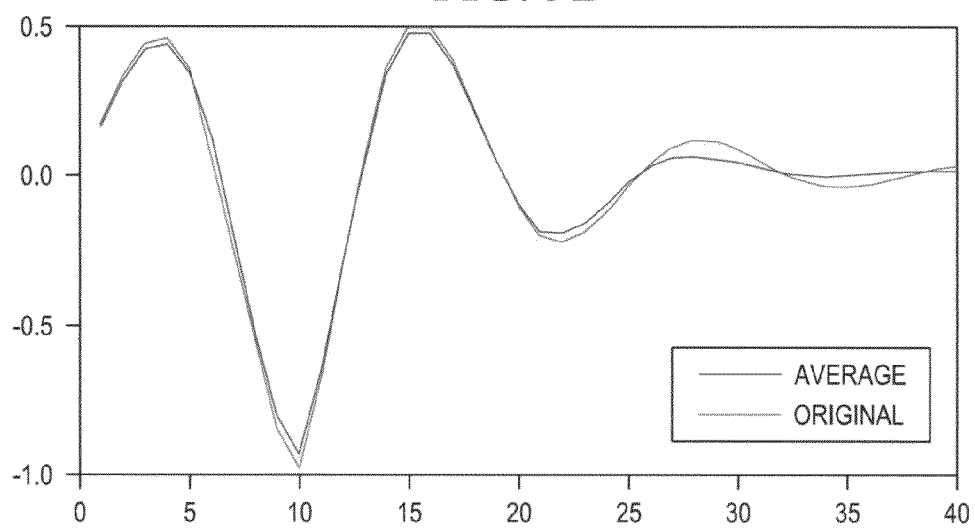
Figure 11A:
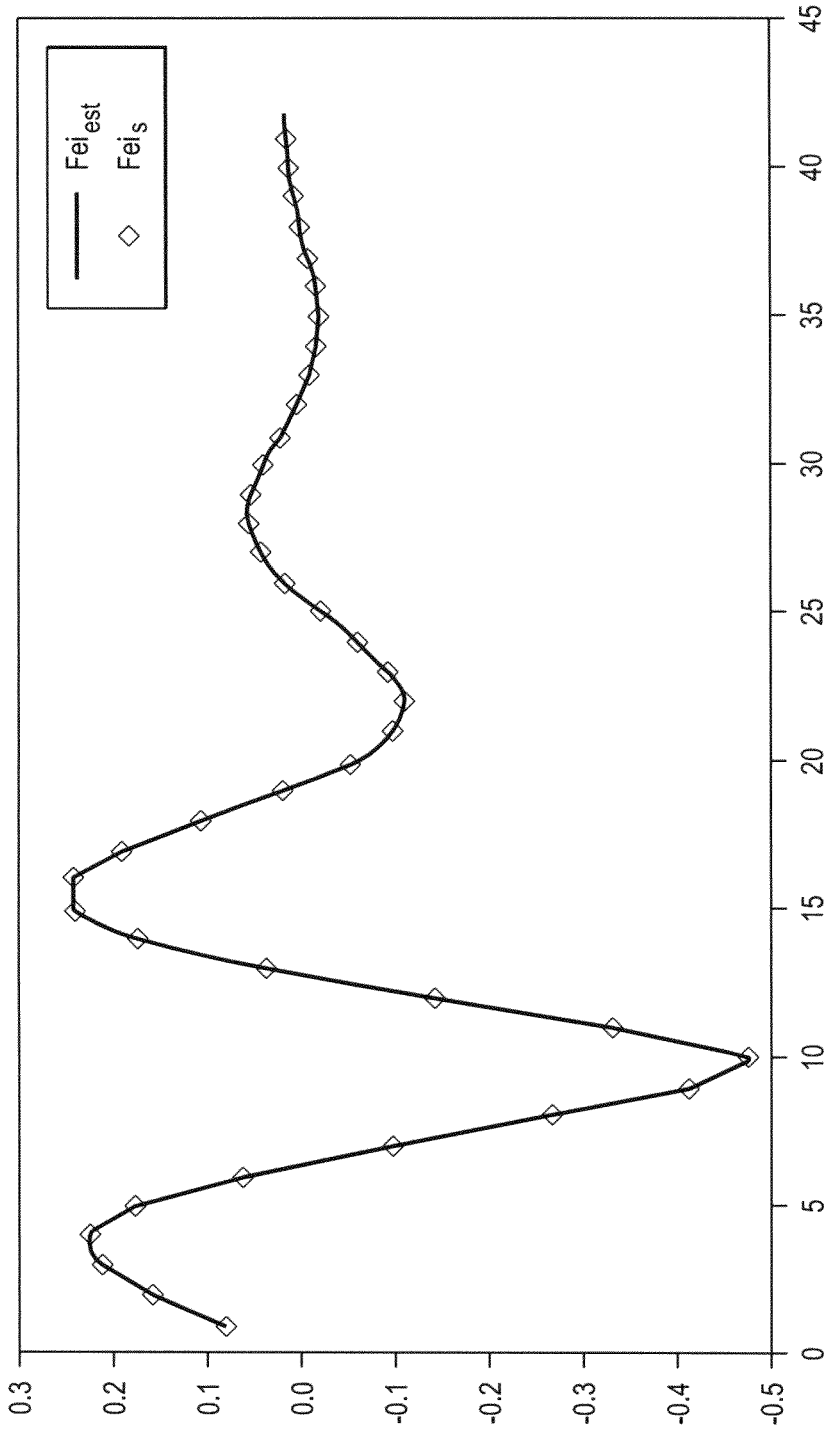
FIG. 11A is a plot of a comparison of an actual and a predicted wavelet obtained from processing according to the present invention.
Figure 11B:
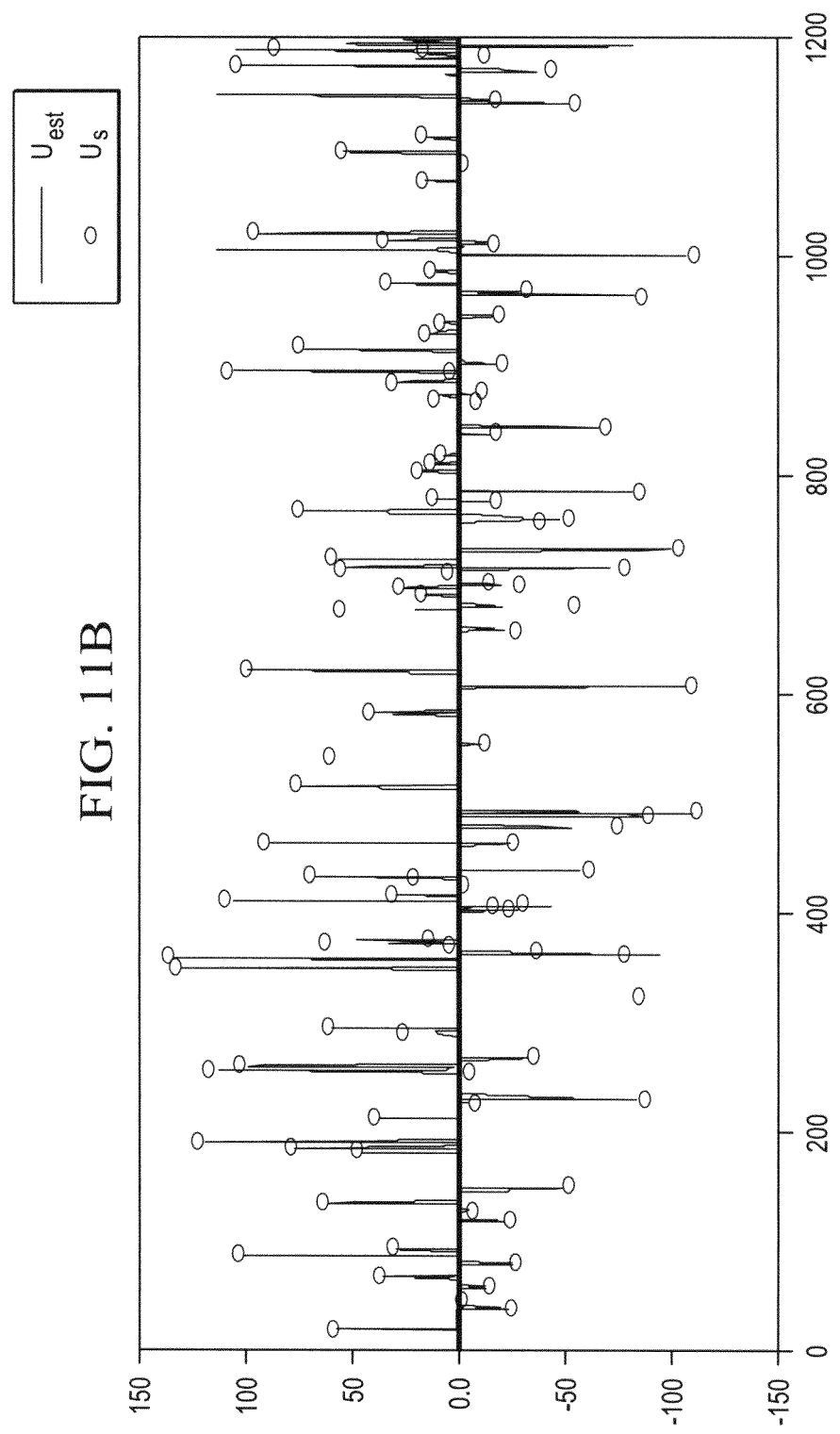
FIG. 11B is a plot of reflectivity from an actual and a predicted wavelet obtained from processing according to the present invention.

The Labat article cited above presents full theoretical descriptions. FIG. 8A displays various wavelets result from Gibbs Sampling with Metropolis-Hastings procedure. Those wavelets vary in amplitude scale and in phase. A scale-shifting technique applied to average those wavelets will give closest target wavelet as shown in FIG. 8B.

Super or Composite Trace

For the purposes of the present invention, it is assumed that the wavelet in a seismic record with multiple channels remains unchanged in each of the multiple channels in the record. Therefore, according to the present invention, a super trace or composite trace is combined during step 60 (FIG. 2) by summing the traces of a seismic trace ensemble or grouping. Details of step 60 are set forth in FIG. 5. During a step 61, a trace ensemble is assembled from the entirety of traces of the survey data being processed. The seismic ensemble from which the super trace is formed may be chosen from several types of groupings, such as shot point or common depth point (CDP), or even over a specified space and time window. The assembled traces in the ensemble are then summed during step 62. With the present invention, forming a super trace has been found to be preferable to previous techniques which extracted multiple wavelets. The advantage of the super trace according to the present invention is to conserve the energy coherence of the deconvolution image, and thus provide as an output a unique wavelet.

Figure 12A:
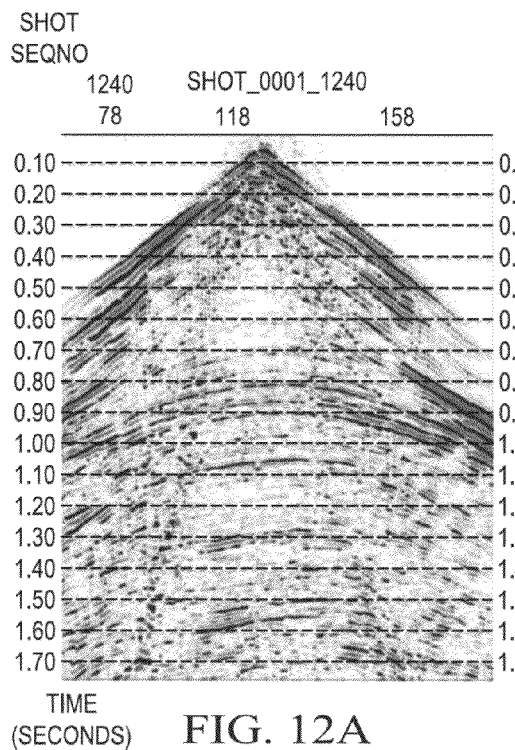
FIGS. 12A, 12B and 12C are plots of seismic records illustrating effects of deconvolution on seismic data.
Figure 12B:
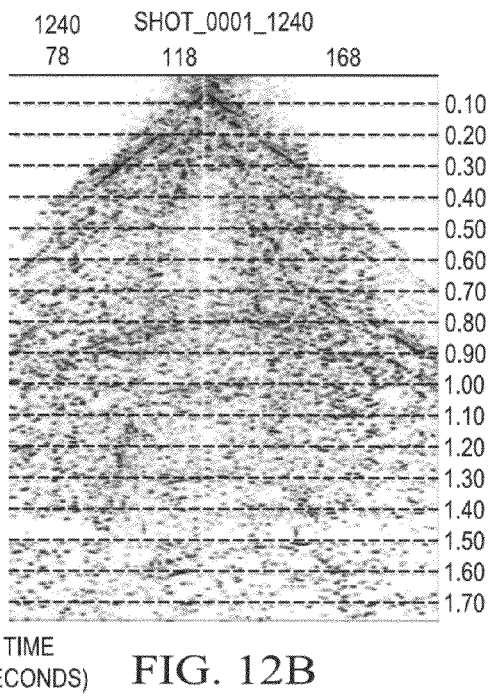
Figure 12C:
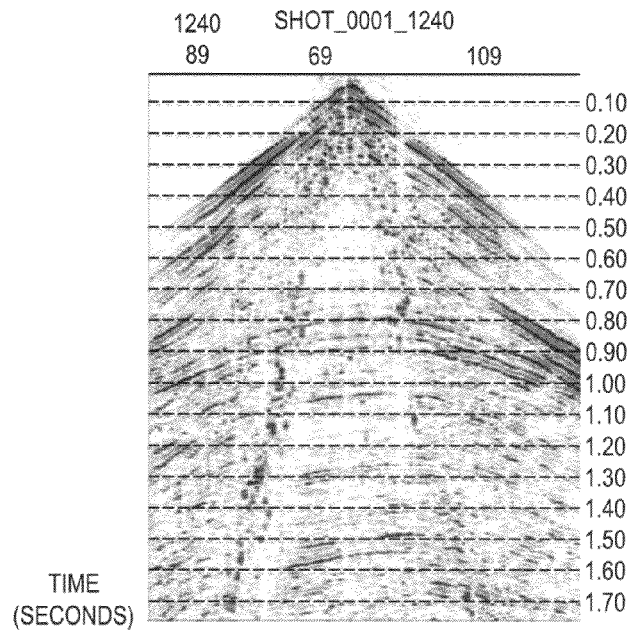

After the super trace is formed it is decoded to multiple traces during step 63 after extraction to recover the deconvolution image. FIG. 12A shows a raw seismic record. FIG. 12B shows the data from the seismic record of FIG. 12A after conventional blind deconvolution using a wavelet extracted from each trace in deconvolution of each trace separately. FIG. 12C illustrates the seismic record of FIG. 12A after deconvolution using a more coherent wavelet formed from treating the entire record as a super trace according to the present invention. It is apparent that significant amounts of noise evident in the record of FIG. 12B have been removed from the trace of FIG. 12C. If desired, the Beta and $\sigma^2$ distribution as well as noise control parameter $\gamma$ and acceptance percentage ratio $\eta$ may each be coded as adjustable according to data signal-to-noise ratio (SNR) and features in the data during step 63. Further descriptions of features of such adjustable coding are contained, for example, in "Simultaneous Wavelet Estimation and Deconvolution of Reflection Seismic Signals" IEEE Transactions on Geosciences and Remote Sensing", Vol. 34, No. 2, p 377-384 (1996).

Time Domain Constraint

In most cases, it has been found with the present invention not possible to achieve an acceptable wavelet even after the steps 40 and 50 are performed. This is because the output wavelet so formed may mathematically fit all parameters, but the output wavelet still occurs at frequencies out of the seismic frequency band. The results of processing which exhibit an out of seismic frequency band wavelet are clearly undesirable because various reasons might cause this inconsistency: noisy data; the geological information might not exactly satisfy the statistics assumption; a parameter used to proximate the distribution might not be optimized, and the like.

Figure 6:
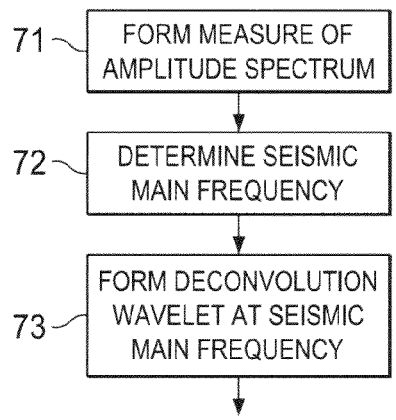
FIG. 6 is a functional block diagram in more detail of a portion of the diagram of FIG. 2.

Therefore, according to the present invention, a time filter constraint is imposed during step 70 on the wavelet being formed. Further details of step 70 are shown in FIG. 6. The time constraint is imposed during step 70 to ensure true and accurate geophysical meaning to the deconvolution processing output. A measure of the average power spectrum of the input seismic data record is formed during step 71, and a time filter is applied to obtain the main seismic frequency from the input seismic record during step 72. A deconvolution Ricker wavelet is then synthesized during step 73 having that determined main seismic frequency. The synthesized Ricker wavelet is then convolved in each iteration during deconvolution to ensure its frequency content.

Figure 13A:
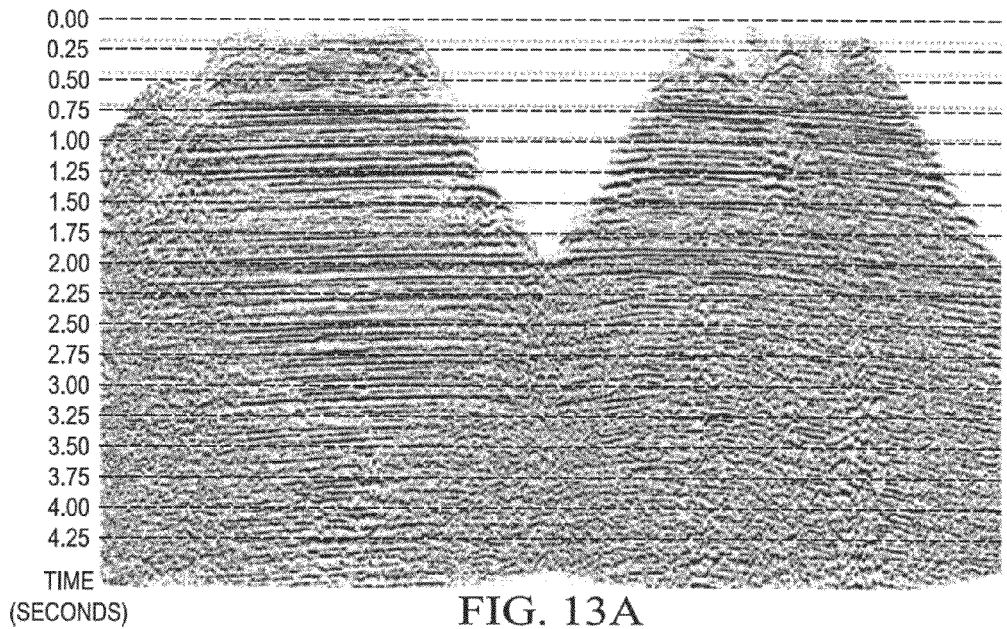
FIGS. 13A, 13B, 13C, 13D, 13E and 13F are plots illustrating the effects of time domain filtering according to the present invention.
Figure 13B:
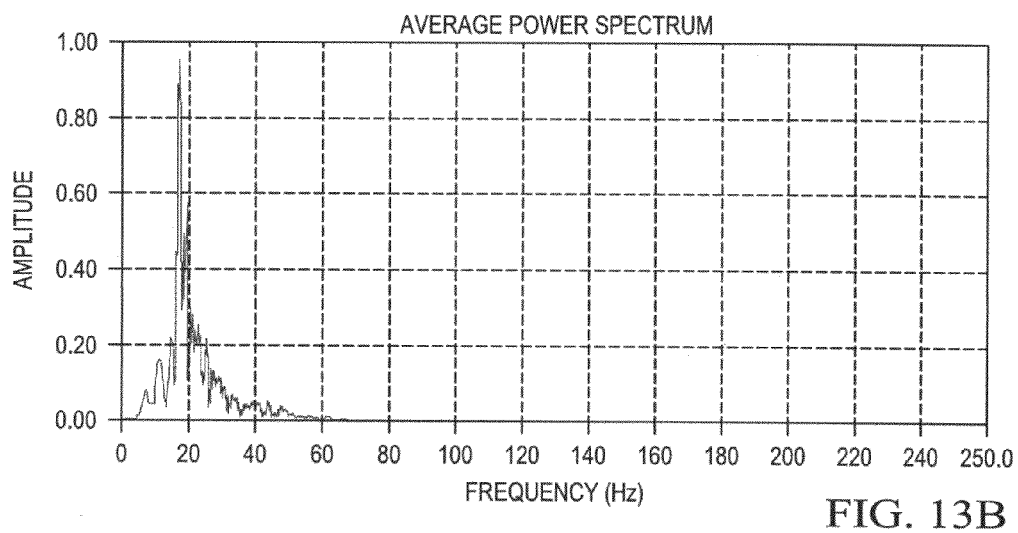
Figure 13C:
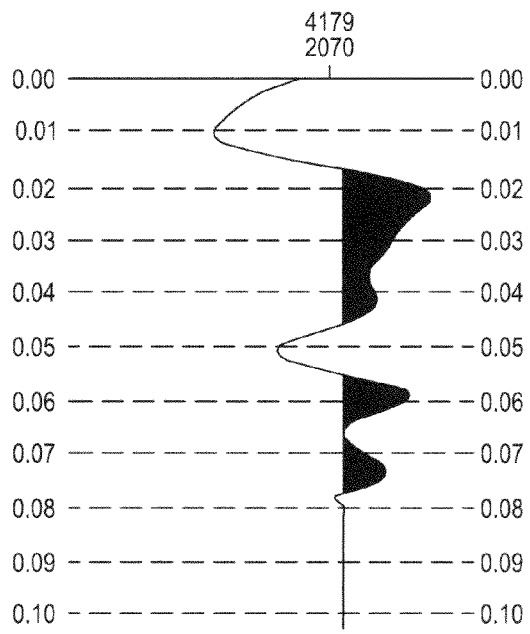
Figure 13D:
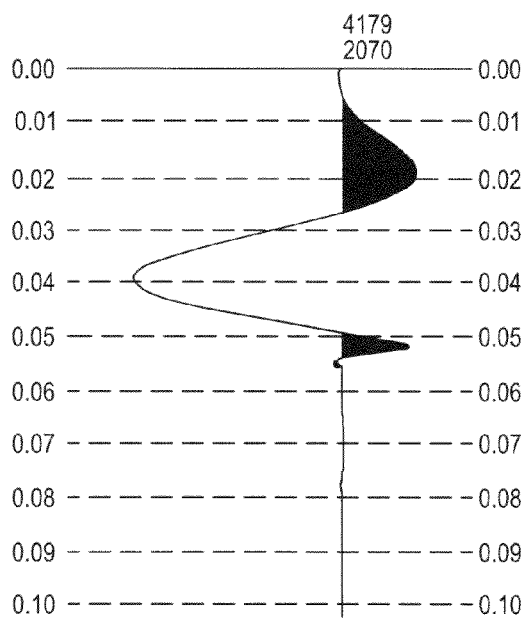
Figure 13E:
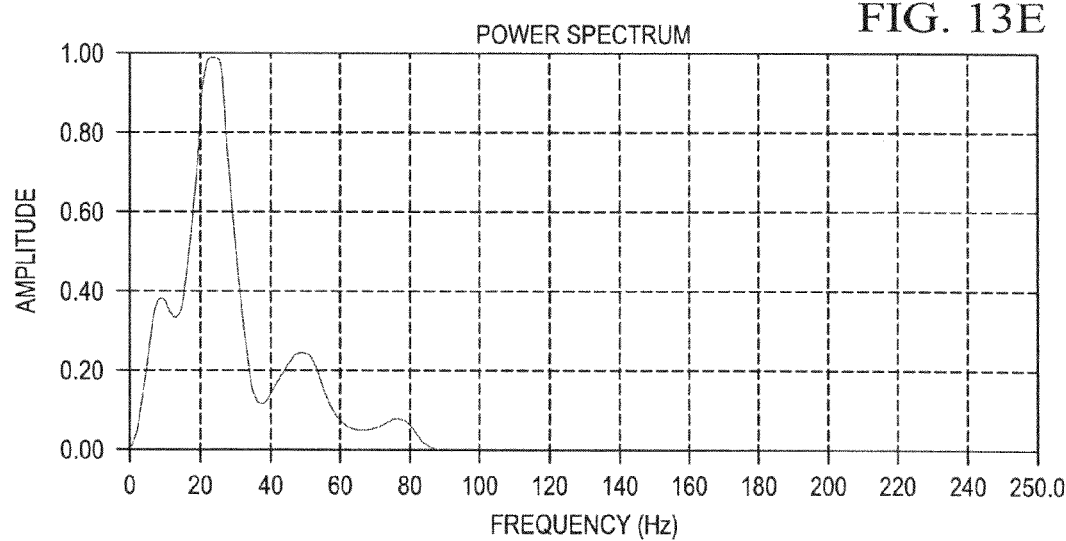

An actual 3D post stack gather is used (FIG. 13A) as input for step 70. The seismic main frequency is determined from a measure of an average power spectrum (FIG. 13B) of the traces of FIG. 13A to be about 20 HZ. An extracted Ricker wavelet formed from the seismic data of FIG. 13A without time domain filtering is shown in FIG. 13C, in which there can be seen to be significant noise present. Further, a power spectrum (FIG. 13E) can be seen to be distorted.

Figure 13F:
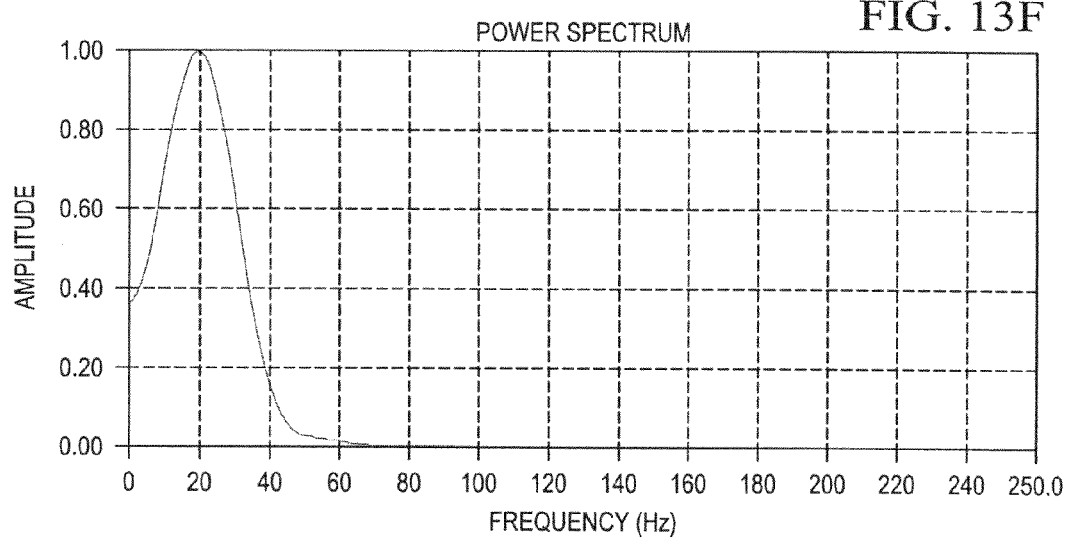

However, by inclusion of a Ricker wavelet, with a main frequency of 20 HZ as a time domain filter, posted into the extracted wavelet during step 70 in every iteration as discussed, a Ricker deconvolution wavelet (FIG. 13D) and power spectrum (FIG. 13F) are obtained. As can be seen, application of time domain constraints according to the present invention reproduces the wavelet and its power spectrum to a geophysically realistic form.

Figure 7:
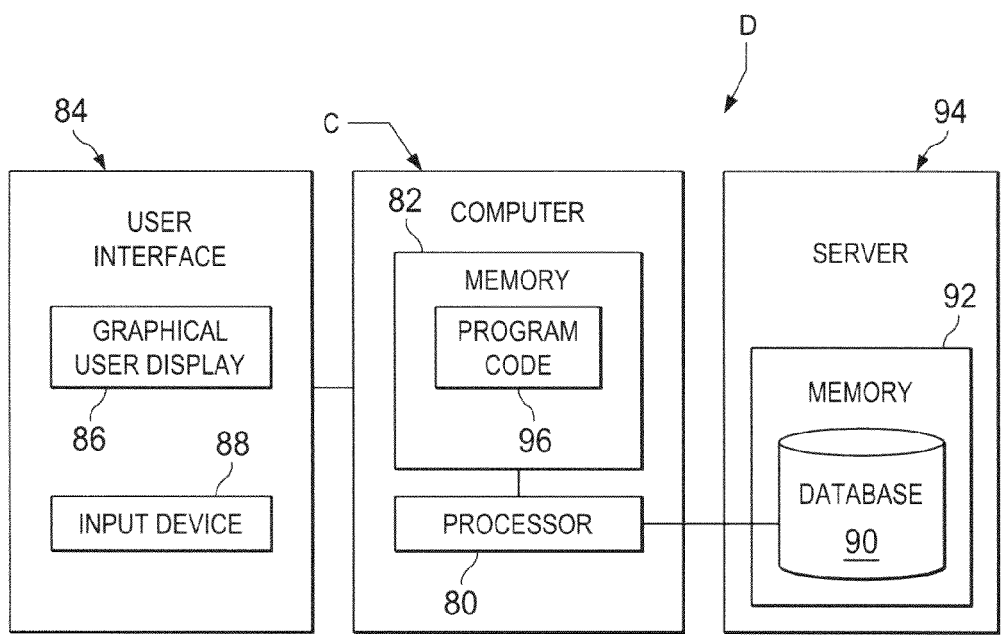
FIG. 7 is a schematic diagram of a computer system for simultaneous wavelet extraction and deconvolution in the time domain according to the present invention.

As illustrated in FIG. 7, a data processing system D according to the present invention includes a computer C having a processor 80 and memory 82 coupled to the processor 90 to store operating instructions, control information and database records therein. The computer C may, if desired, be a portable digital processor, such as a personal computer in the form of a laptop computer, notebook computer or other suitable programmed or programmable digital data processing apparatus, such as a desktop computer. It should also be understood that the computer C may be a multicore processor with nodes such as those from Intel Corporation or Advanced Micro Devices (AMD), or a mainframe computer of any conventional type of suitable processing capacity such as those available from International Business Machines (IBM) of Armonk, N.Y. or other source.

The computer C has a user interface 84 and an output display 86 for displaying output data or records of processing of seismic data survey measurements performed according to the present invention for simultaneous wavelet extraction and deconvolution in the time domain. The output display 86 includes components such as a printer and an output display screen capable of providing printed output information or visible displays in the form of graphs, data sheets, graphical images, data plots and the like as output records or images.

The user interface 84 of computer C also includes a suitable user input device or input/output control unit 88 to provide a user access to control or access information and database records and operate the computer C. Data processing system D further includes a database 90 stored in computer memory, which may be internal memory 82, or an external, networked, or non-networked memory as indicated at 92 in an associated database server 94.

The data processing system D includes program code 96 stored in non-transitory memory 82 of the computer C. The program code 96, according to the present invention is in the form of computer operable instructions causing the data processor 80 to perform simultaneous wavelet extraction and deconvolution, as will be set forth.

It should be noted that program code 96 may be in the four of microcode, programs, routines, or symbolic computer operable languages that provide a specific set of ordered operations that control the functioning of the data processing system D and direct its operation. The instructions of program code 96 may be may be stored in memory 82 of the computer C, or on computer diskette, magnetic tape, conventional hard disk drive, electronic read-only memory, optical storage device, or other appropriate data storage device having a non-transitory computer usable medium stored thereon. Program code 96 may also be contained on a data storage device such as server 94 as a non-transitory computer readable medium, as shown.

The method of the present invention performed in the computer C can be implemented utilizing the computer program steps of FIG. 4 stored in memory 82 and executable by system processor 80 of computer C. The input data to processing system D are the input field seismic record and other data including, for example, wavelet length, main seismic frequency, and maximum number of iterations, etc. to run the algorithm.

Figure 14B:
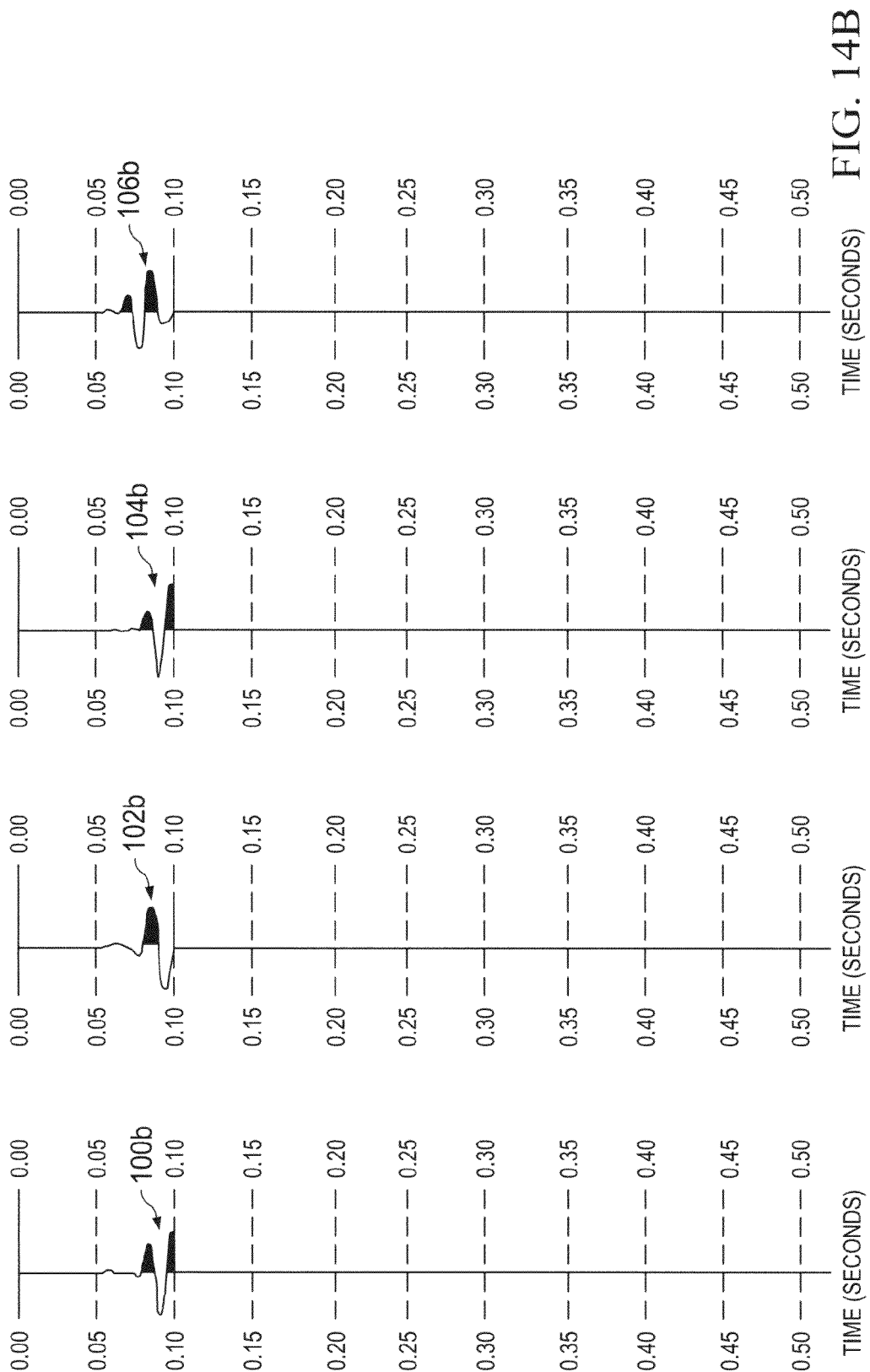

FIGS. 14A and 14B illustrate examples of how the time domain filter is important to provide an acceptable output wavelet to meet seismic processing needs. FIG. 14A illustrates an extracted wavelet 100a for an air gun source, and extracted wavelets 102a for a vibratory source, 104a for a dynamite source and 106a for a combined source. FIG. 14B illustrates wavelets processed according to the present invention on which time domain constraints are imposed for the same sources: a wavelet 100b for an air gun source, and wavelets 102b for a vibratory source, 104b for a dynamite source and 106b for a combined source. As can be seen, the wavelets of FIG. 14B are more representative of actual wavelets than those of FIG. 14A.

Synthetic Test Data Experiments

The processing techniques of the present invention were investigated on synthetic data. A time invariant random number generator was introduced for sampling. A sparse reflectivity sequence was generated by Gaussian distribution with accept probability of 0.03, with 0.05 variance of additive Gaussian noise.

Figure 15:
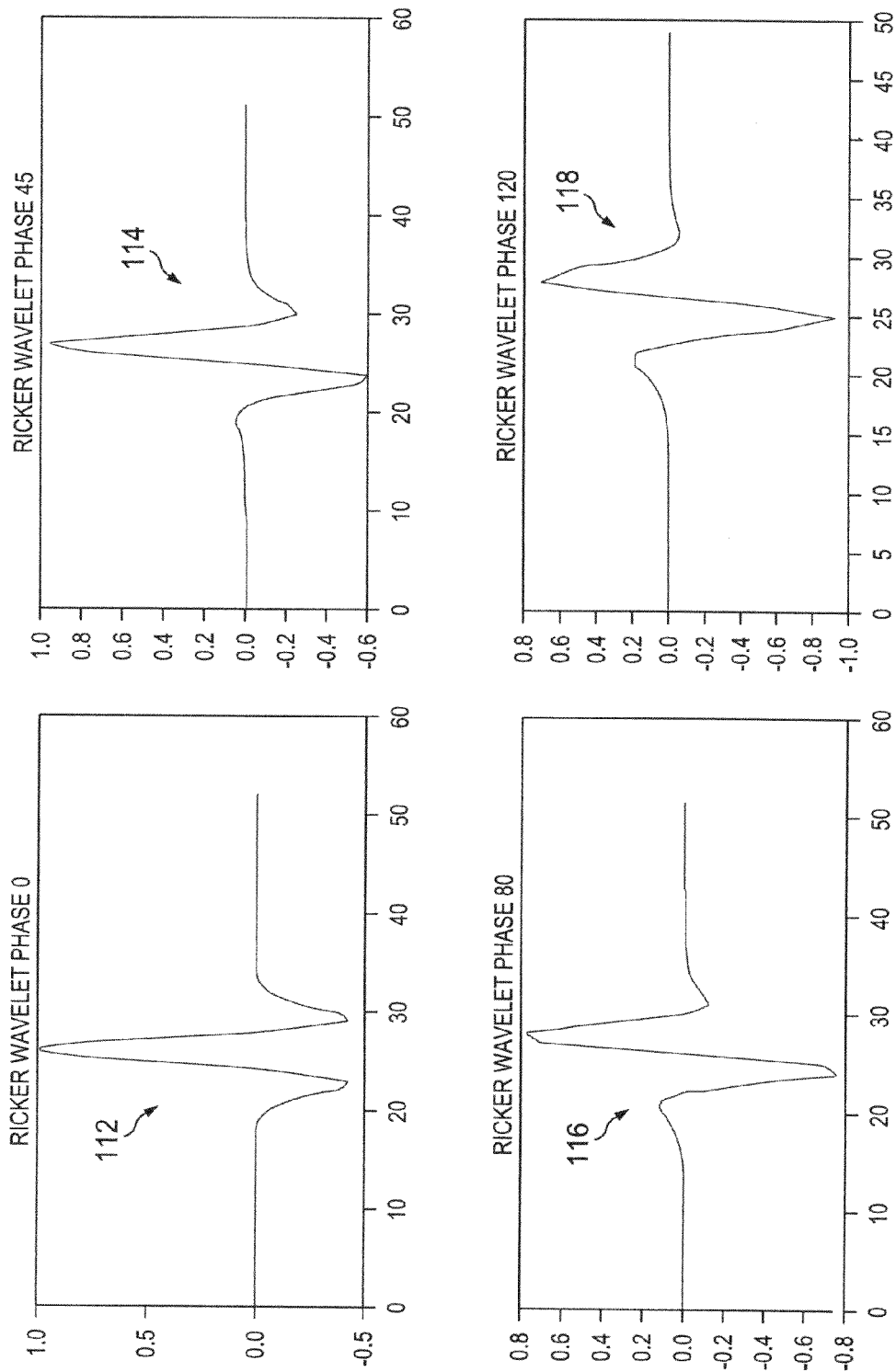
FIG. 15 is a set of synthetically generated Ricker wavelets with different phase shifts in them.
Figure 16:
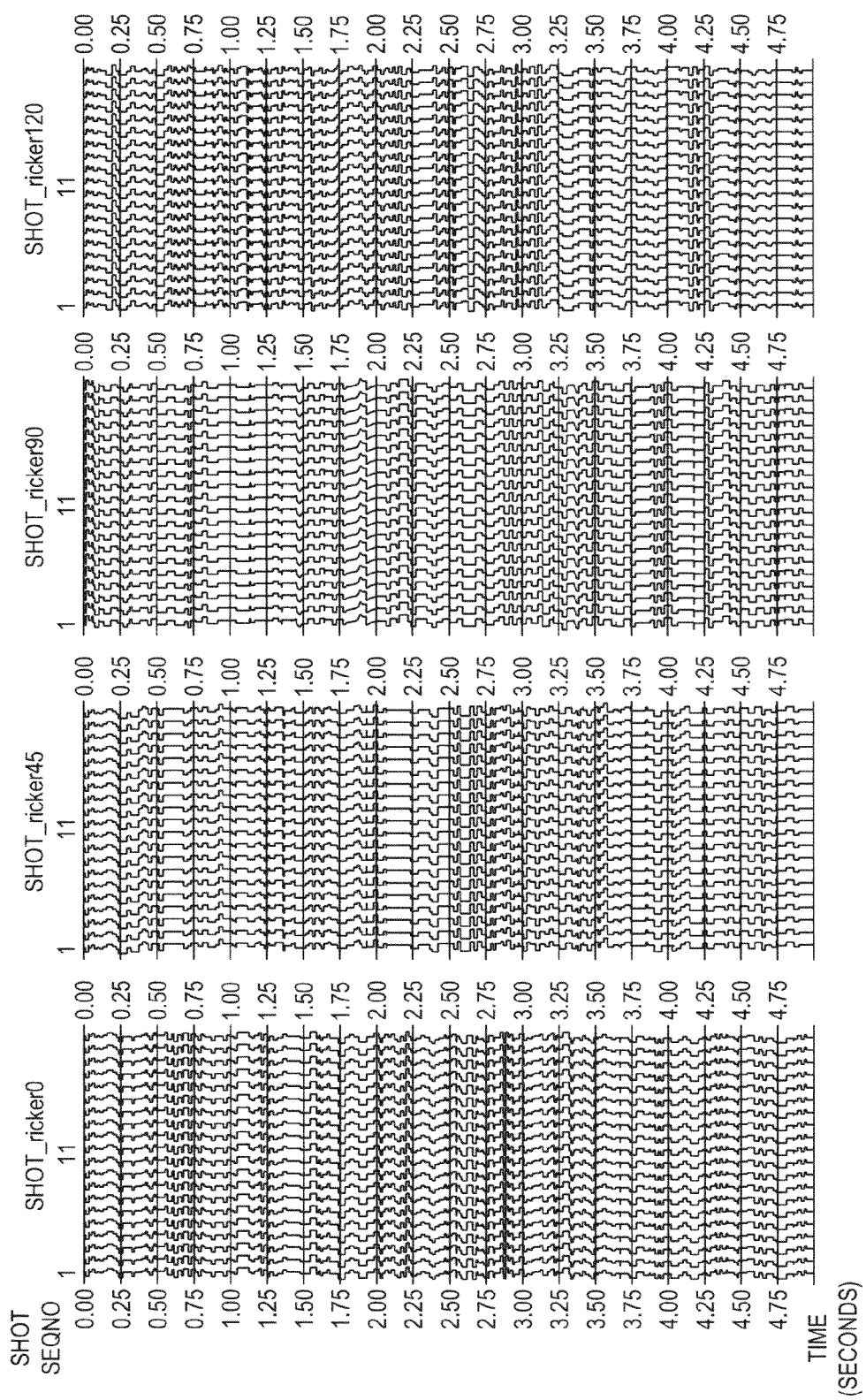
FIG. 16 is a group of synthetic seismic data generated using the synthetically generated Ricker wavelets of FIG. 15.
Figure 17:
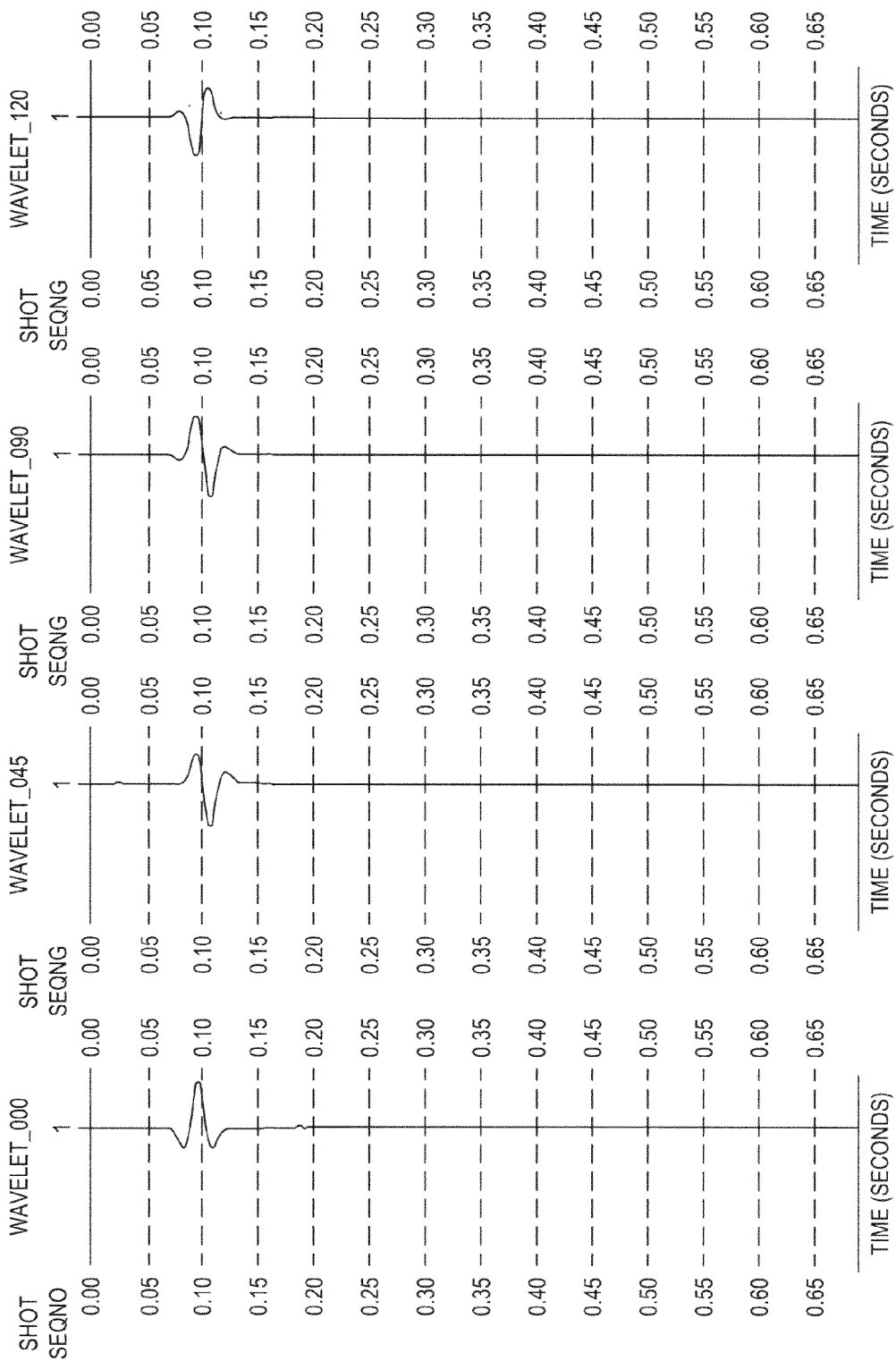
FIG. 17 is a set of plots of extracted wavelets based on the synthetic seismic data of FIG. 16 obtained according to the present invention.

Four Ricker wavelets (FIG. 15) each with a main frequency of 30 Hz were produced with different phase: a wavelet 112 with phase of 0°, a wavelet 114 with phase of 45°, a wavelet 116 with a phase of 90° and a wavelet 118 with phase of 120°. The four wavelets were used to convolve with sparse random reflectivity to generate the synthetic data plotted in FIG. 16. By supplying the synthetics as input, four corresponding wavelets (FIG. 17) were then obtained. The extracted 0° phase wavelet 112 and the extracted 120° phase wavelet 118, respectively, can be seen to match their original form wavelet exactly. The wavelets 112 and 118 extracted for the 90° degree and 120° wavelets each has a polarity reversal (180° phase difference) from its original form; reflectivity and wavelet cannot be differentiated for polarity reversal. In a word, two pairs of wavelets appear to meet the parameter fittings. One pair is a 180° polarity reversal of the other pair, as is evident from FIG. 17. However, this should not hinder any practical utilization for the purposes of either deconvolution or processing quality control.

Actual Field Seismic Data Example

Figure 18A:
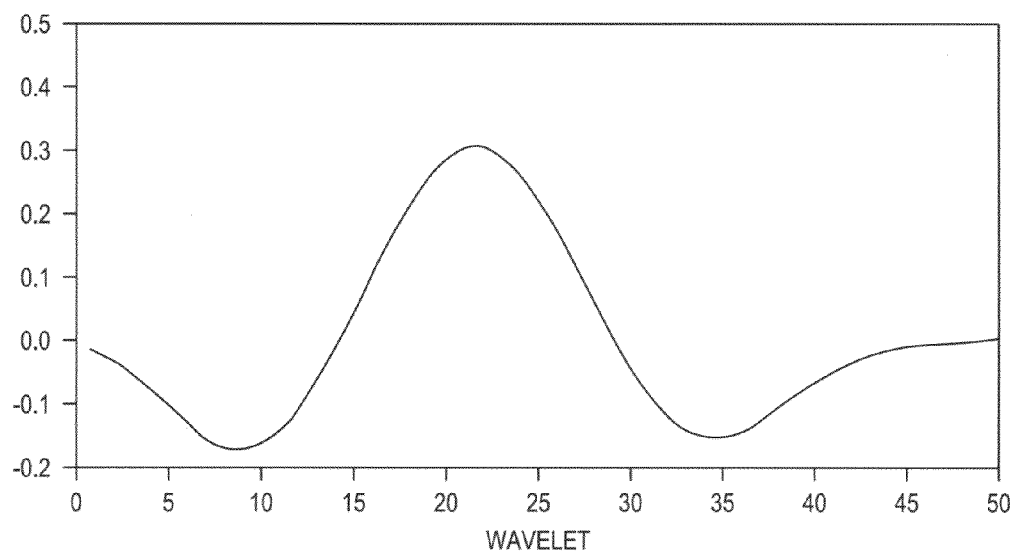
FIG. 18A is a plot of a wavelet obtained by pre-stack wavelet extraction with conventional processing from an area where wavelet form is known based on well data.
Figure 18B:
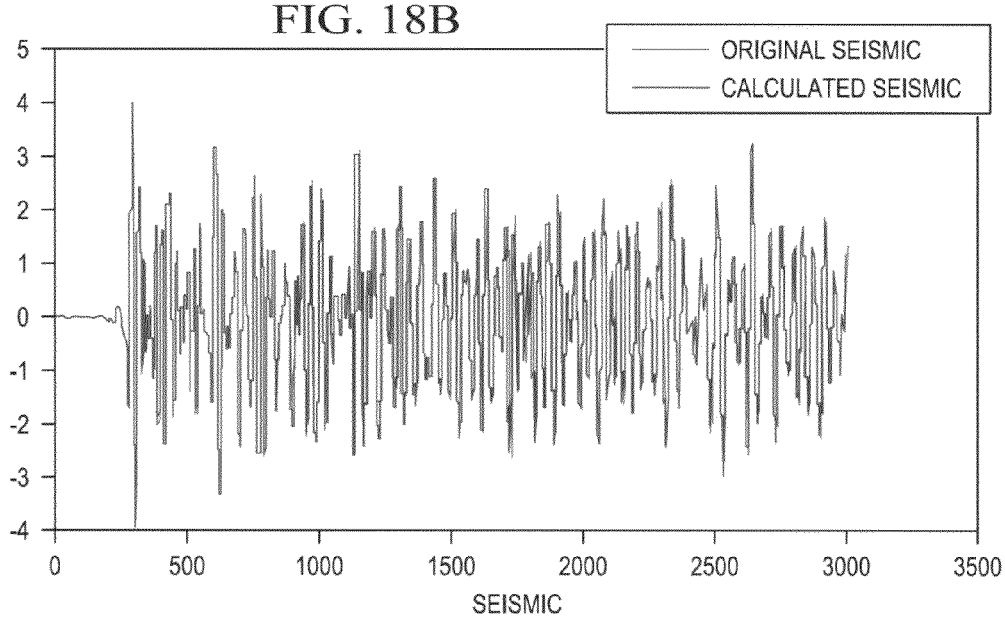
FIG. 18B is a comparison plot of an original seismic trace and the result of convolution of the wavelet of FIG. 18A with reflectivity data from the same seismic trace.

The processing techniques of the present invention were also applied to a set of pre-stack data. A shot record from an actual survey was chosen, which was pre-processed through basic seismic processing flow with sample rate of 2 ms. Thirteen traces were combined together to form a super trace, which was used as input. A wavelet length of 50 samples was specified with 2000 cycles of iteration. The object function η is 0.90, with noise control parameter Gamma supplied equal to 1.0. The results are shown in FIGS. 18A and 18B FIG. 18A is the extracted wavelet. It appears sound in a geophysical context and appears to have a form of a zero phase wavelet, though no comparison result was performable. The simulation result listed in FIG. 18B indicates the error between the original input seismic trace and convolved seismic trace is so small that for practical purposes it is ignorable.

Figure 19A:
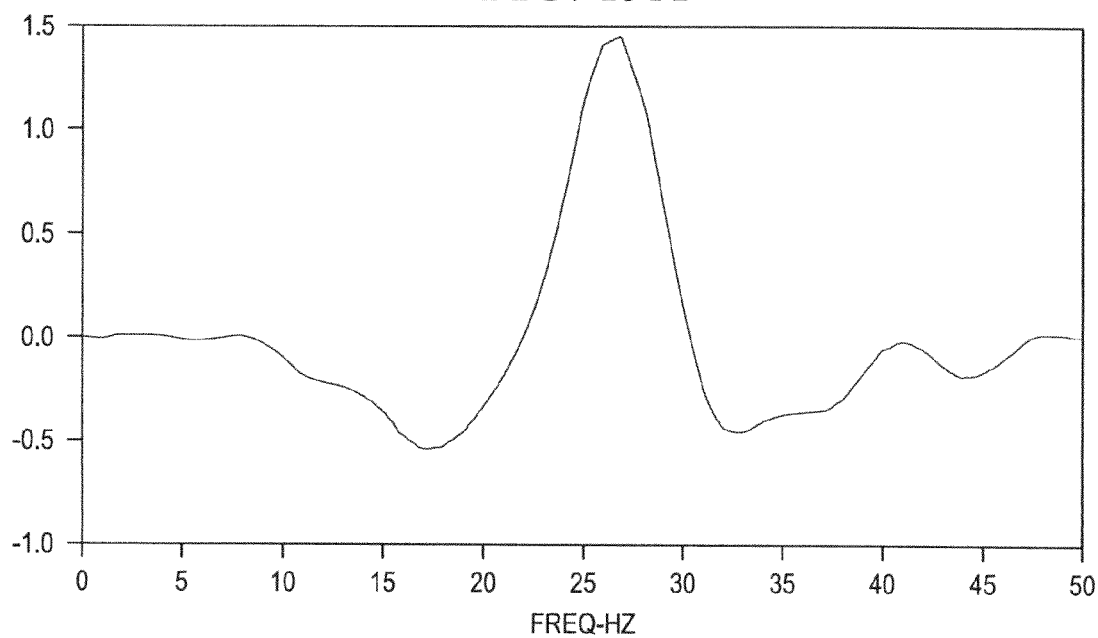
FIG. 19A is a plot of an actual wavelet obtained from processing according to conventional processing methods.
Figure 19B:
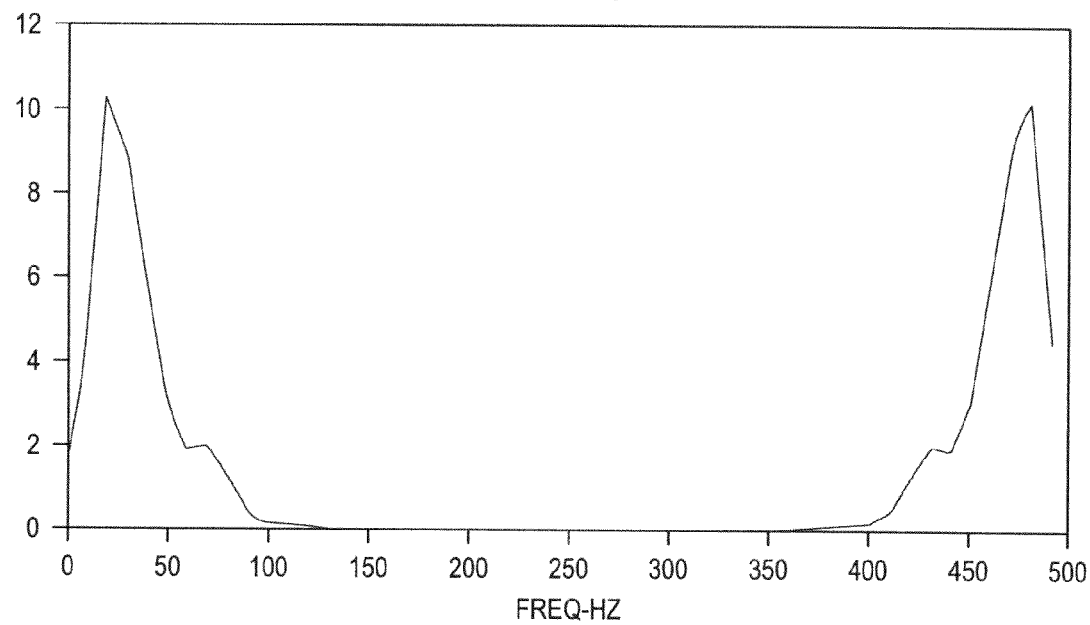
FIG. 19B is a plot of an actual wavelet obtained from processing according to the present invention.
Figure 19C:
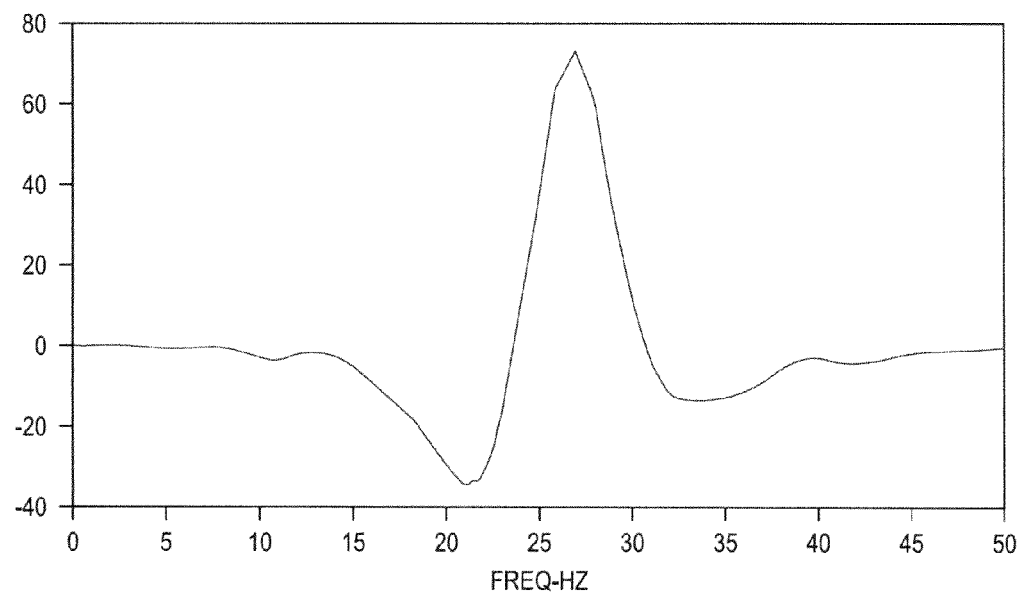
FIG. 19C is a plot of the power spectrum of the wavelet of FIG. 19A.
Figure 19D:
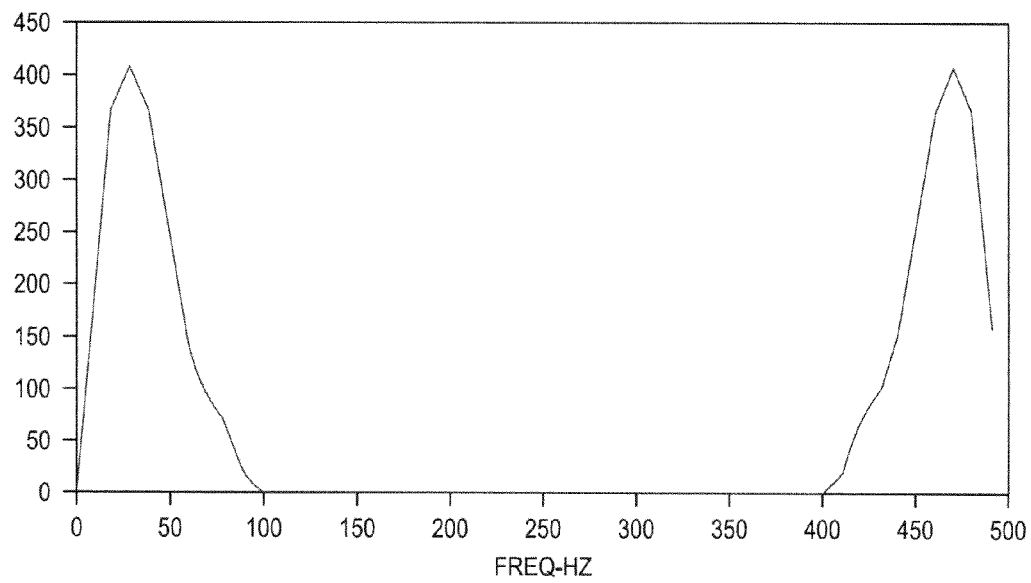
FIG. 19D is a plot of the power spectrum of the wavelet of FIG. 19B.

In addition, an angle-stack CDP-order 3D post stack section was used as the model. The field seismic data was tested by currently available (Jason's Geophysical) software, in comparison with that of the present invention. The time window of 1000~2500 ms and 15 traces from cross-line CDP were included. The parameters for processing according to the present invention were: an assigned wavelet length of 100 ms; noise parameter of Gamma 2, the acceptance η of 0.95, and the number of iteration cycles was 4000. An extracted wavelet (FIG. 19B) and associated power spectrum (FIG. 19D) were compared with a wavelet (FIG. 19A) and power spectrum (FIG. 19C) obtained from Jason's Geophysical software as to wavelet shape and power spectrum. The phase of the wavelet in FIG. 19B differs very slightly from zero phase, but the wavelet is very close in both shape and amplitude spectrum to that of FIG. 19A. The power spectrum in FIG. 19D of the wavelet of FIG. 19B is not as smooth as the amplitude spectrum in FIG. 19C. However, this is as a result of the use of a totally different estimation principles with the present invention illustrated. The data in the FIG. 19C wavelet was estimated from both seismic and well log data as input where reflectivity is extracted from well log data thus making the extraction more precisely determinable. The present invention obtains two unknowns: wavelet and reflectivity from the seismic data alone without well log data.

Also, the statistical inversion naturally contains some vibratory energy different from traditional approaches. Again, this should not affect deconvolution or process quality control.

From the foregoing, it can be seen that with the present invention, it is feasible to apply a time domain approach to extract a mixed phase wavelet and obtain a deconvolution image simultaneously without requiring well log information. The present invention when applied in conjunction with the MCMC methodology appears to remedy both the wavelet time shift and scale ambiguity problems typically seen in known blind deconvolution techniques.

A time filter constructed from a seismic major frequency offers another layer of geophysical constraint to the output wavelet. The super or composite trace formed according to the present invention and utilized in data preparation improves the deconvolution image resolution and coherency.

The present invention when implemented in conjunction with MCMC processing has been found to address the issues associated with blind deconvolution according to the prior art. The present invention modifies the MCMC sampling step to solve MCMC's inherent time shift ambiguity and uses a unified energy coefficient and averaging of wavelets to solve scale ambiguity. The present invention also reduces dependency on input data for deconvolution and provides a good wavelet in theory as synthetic test confirms.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A data processing system for processing seismic data obtained in the form of seismic traces from a reflection seismic survey of subsurface portions of the earth for analysis of subsurface features of interest, the data processing system comprising:
    a processor performing the steps of:
    forming a wavelet from the seismic survey data;
    resolving a time of occurrence of maximum energy in the wavelet from the seismic survey data;
    forming a normalized amplitude of energy for the wavelet from traces in the seismic survey data;
    forming a composite trace at the resolved time of occurrence and normalized amplitude from an ensemble of the traces in the seismic survey data;
    applying a time filter to the wavelet based on the composite trace to form a resultant deconvolution wavelet having a main frequency in the seismic frequency band; and
    performing a deconvolution operation on the seismic traces by applying the resultant deconvolution wavelet to the seismic data for analysis of subsurface features of interest.

2. The data processing system of claim 1, wherein the processor in performing the step of forming a normalized amplitude of energy for the wavelet performs the steps of:
    forming an estimate of amplitude of the wavelet amplitude;
    adjusting the estimate of the wavelet amplitude to minimize a total error function; and
    forming an average of the adjusted estimate of the wavelet amplitude.

3. The data processing system of claim 1, wherein the processor in performing the step of forming a composite trace performs the step of:
    forming a composite trace at the resolved time of occurrence and normalized amplitude from a selected group of the traces in the seismic survey data.

4. The data processing system of claim 1, wherein the selected group of traces comprises a common depth point gather of the traces in the seismic survey data.

5. The data processing system of claim 1, wherein the selected group of traces comprises a shot point gather of the traces in the seismic survey data.

6. The data processing system of claim 1, wherein the processor in performing the step of applying a time filter to the wavelet performs the steps of:
    forming a measure of the average power spectrum of the composite trace;
    determining a seismic main frequency of the presence of average power in the composite trace; and
    forming the resultant deconvolution wavelet at the determined seismic main frequency.

7. A data storage device having stored in a non-transitory computer readable medium computer operable instructions for causing a data processing system to process seismic data obtained in the form of seismic traces from a reflection seismic survey of subsurface portions of the earth for analysis of subsurface features of interest, the instructions stored in the data storage device causing the data processing system to perform the following steps:
    forming a wavelet from the seismic survey data;
    resolving a time of occurrence of maximum energy in the wavelet from the seismic survey data;
    forming normalized amplitude of energy for the wavelet from traces in the seismic survey data;
    forming a composite trace at the resolved time of occurrence and normalized amplitude from an ensemble of the traces in the seismic survey data;
    applying a time filter to the wavelet based on the composite trace to form a resultant deconvolution wavelet having a main frequency in the seismic frequency band; and
    performing a deconvolution operation by applying the resultant deconvolution wavelet to the seismic data for analysis of subsurface features of interest.

8. The data storage device of claim 7, wherein the instructions stored in the data storage device cause the data processing system in performing the step of forming a normalized amplitude of energy for the wavelet to perform the following steps:
    forming an estimate of amplitude of the wavelet amplitude;
    adjusting the estimate of the wavelet amplitude to minimize a total error function; and
    forming an average of the adjusted estimate of the wavelet amplitude.

9. The data storage device of claim 7, wherein the instructions stored in the data storage device cause the data processing system in performing the step of forming a composite trace to perform the following steps:
    forming a composite trace at the resolved time of occurrence and normalized amplitude from a selected group of the traces in the seismic survey data.

10. The data storage device of claim 9, wherein the selected group of traces comprises a common depth point gather of the traces in the seismic survey data.

11. The data storage device of claim 9, wherein the selected group of traces comprises a shot point gather of the traces in the seismic survey data.

12. The data storage device of claim 7, wherein the instructions stored in the data storage device cause the data processing system in performing the step of applying a time filter to the wavelet to perform the following steps:
- forming a measure of the average power spectrum of the composite trace;
- determining a seismic main frequency of the presence of average power in the composite trace; and
- forming the resultant deconvolution wavelet at the determined seismic main frequency.

* * * * *